United States Patent
Khoshnevisan et al.

(10) Patent No.: US 12,150,119 B2
(45) Date of Patent: Nov. 19, 2024

(54) TECHNIQUES FOR CONTROL CHANNEL REPETITION ACROSS COMPONENT CARRIERS

(71) Applicant: QUALCOMM Incorporated, San Diego, CA (US)

(72) Inventors: Mostafa Khoshnevisan, San Diego, CA (US); Kazuki Takeda, Tokyo (JP); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/558,358

(22) Filed: Dec. 21, 2021

(65) Prior Publication Data
US 2022/0304017 A1 Sep. 22, 2022

Related U.S. Application Data

(60) Provisional application No. 63/163,548, filed on Mar. 19, 2021.

(51) Int. Cl.
*H04W 72/12* (2023.01)
*H04L 5/00* (2006.01)
(Continued)

(52) U.S. Cl.
CPC ......... *H04W 72/1268* (2013.01); *H04L 5/001* (2013.01); *H04L 27/26025* (2021.01); *H04W 72/0446* (2013.01); *H04W 72/23* (2023.01)

(58) Field of Classification Search
CPC ......... H04W 72/1268; H04W 72/0446; H04W 72/23; H04L 27/26025; H04L 1/08
See application file for complete search history.

(56) References Cited

U.S. PATENT DOCUMENTS

| 2018/0048448 A1* | 2/2018 | Zhang | H04W 24/10 |
| 2020/0022119 A1* | 1/2020 | Wang | H04W 72/12 |

(Continued)

FOREIGN PATENT DOCUMENTS

CN 110876204 A 3/2020

OTHER PUBLICATIONS

International Search Report and Written Opinion—PCT/US2022/017162—ISA/EPO—Jun. 14, 2022 (2103036WO).

(Continued)

*Primary Examiner* — Fahmida S Chowdhury
(74) *Attorney, Agent, or Firm* — Holland & Hart LLP

(57) ABSTRACT

Methods, systems, and devices for wireless communications are described. A user equipment (UE) may receive, from a base station, a scheduling configuration for scheduling communications on a first component carrier. The scheduling configuration may indicate at least a first downlink control channel candidate on a second component carrier that is linked for control message repetition to a second downlink control channel candidate on one of the first component carrier or a third component carrier. The UE may then receive, from the base station and based on the scheduling configuration, at least one repetition of a control message in the first downlink control channel candidate or the second downlink control channel candidate, the control message scheduling a communication between the base station and the UE over the first component carrier. The UE may then transmit or receive the communication with the base station over the first component carrier.

30 Claims, 18 Drawing Sheets

(51) Int. Cl.
*H04L 27/26* (2006.01)
*H04W 72/0446* (2023.01)
*H04W 72/1268* (2023.01)
*H04W 72/23* (2023.01)

(56) References Cited

U.S. PATENT DOCUMENTS

| | | | |
|---|---|---|---|
| 2020/0022144 A1 | 1/2020 | Papasakellariou | |
| 2020/0029316 A1* | 1/2020 | Zhou | H04W 74/0833 |
| 2020/0053757 A1* | 2/2020 | Bagheri | H04W 24/08 |
| 2020/0100179 A1* | 3/2020 | Zhou | H04W 76/20 |
| 2020/0382157 A1* | 12/2020 | Bhamri | H04B 1/7143 |
| 2021/0144714 A1* | 5/2021 | Takeda | H04W 72/53 |
| 2021/0297114 A1* | 9/2021 | Zhang | H04B 7/0671 |
| 2021/0352501 A1* | 11/2021 | Taherzadeh Boroujeni | H04W 72/0446 |
| 2022/0279557 A1* | 9/2022 | Li | H04W 52/0206 |
| 2022/0304037 A1* | 9/2022 | Zhang | H04L 5/0053 |
| 2022/0338178 A1* | 10/2022 | Kuang | H04W 52/0229 |
| 2023/0156659 A1* | 5/2023 | Li | H04W 68/02 455/458 |
| 2023/0156665 A1* | 5/2023 | Gao | H04W 72/02 370/329 |
| 2023/0156699 A1* | 5/2023 | Gao | H04W 72/20 370/329 |
| 2023/0156752 A1* | 5/2023 | Tuong Tran | H04W 72/1273 370/329 |
| 2023/0283438 A1* | 9/2023 | Zhang | H04L 5/0053 370/329 |
| 2024/0064763 A1* | 2/2024 | Nunome | H04L 1/0046 |

OTHER PUBLICATIONS

Qualcomm Incorporated: "Enhancements on Multi-TRP for PDCCH PUCCH and PUSCH", 3GPP TSG-RAN WG1 Meeting #106-bis-e, 3GPP Draft, R1-2110166, 3rd Generation Partnership Project (3GPP), Mobile Competence Centre, 650, Route Des Lucioles, F-06921 Sophia-Antipolis Cedex, France, vol. RAN WG1, No. eMeeting, Oct. 11, 2021-Oct. 19, 2021, Oct. 2, 2021 (Oct. 2, 2021), 23 Pages, XP052059102, Retrieved from the Internet: URL: https://ftp.3gpp.org/tsg_ran/WG1_RL1/TSGR1_106b-e/Docs/R1-2110166.zip, R1-2110166 Enhancements on Multi-TRP for PDCCH, PUCCH and PUSCH.docx [retrieved on Oct. 2, 2021], p. 14-p. 15, figures 6-7.

Spreadtrum Communications: "Discussion on PDCCH Enhancement on URLLC", 3GPP TSG RAN WG1 Meeting #95, 3GPP Draft, R1-1813064 Discussion on PDCCH Enhancement on URLLC, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 2018 (Nov. 11, 2018), 4 Pages, XP051555047, Retrieved from the Internet: URL: http://www.3gpp.org/ftp/Meetings%5F3GPP%5FSYNC/RAN1/Docs/R1%2D1813064%2Ezip, [retrieved on Nov. 11, 2018], p. 1, line 6 before end of page "Multiple PDCCH Monitoring Occasions in one CORESET", p. 2, line 3-line 4.

\* cited by examiner

TECHNIQUES FOR CONTROL CHANNEL REPETITION ACROSS COMPONENT CARRIERS

CROSS REFERENCE

The present application for patent claims the benefit of U.S. Provisional Patent Application No. 63/163,548 by KHOSHNEVISAN et al., entitled "TECHNIQUES FOR CONTROL CHANNEL REPETITION ACROSS COMPONENT CARRIERS," filed Mar. 19, 2021, assigned to the assignee hereof, and expressly incorporated by reference herein.

FIELD OF TECHNOLOGY

The following relates to wireless communications, including techniques for control channel repetition across component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may enable communications within a component carrier component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). A carrier indicator field (CIF) within control signaling may indicate whether the control signaling is scheduling communications within the same component carrier or a different component carrier. In some wireless communications systems, a single component carrier may be scheduled via control signaling received on multiple component carriers. That is, a "scheduled component carrier" may be scheduled via control signaling on multiple "scheduling component carriers." However, some wireless communications systems impose limitations on cross-carrier scheduling, which may inhibit the utility of cross-carrier scheduling.

SUMMARY

The described techniques relate to improved methods, systems, devices, and apparatuses that support techniques for control channel repetition across component carriers. Generally, the aspects of the present disclosure provide techniques for control channel repetition across multiple component carriers for cross-carrier scheduling. In particular, techniques described herein support techniques for "linking" control channel candidates (e.g., physical downlink control channel (PDCCH) candidates) across multiple scheduling component carriers for control channel repetition (e.g., PDCCH repetition), where the multiple control channel candidates may be used to schedule communications within a scheduled component carrier. A user equipment (UE) may attempt to decode signals received within each of the PDCCH candidates of a search space set to determine if a cyclic redundancy check (CRC) passes for any of the candidates. For example, a UE may receive a scheduling configuration which indicates multiple PDCCH candidates for scheduling communications on a first component carrier ("scheduled component carrier"), where the multiple PDCCH candidates are linked for PDCCH repetition. For instance, a first PDCCH candidate and a second PDCCH candidate may be positioned within a second component carrier and a third component carrier, respectively ("scheduling component carrier"). In other cases, at least one PDCCH candidate may be positioned within the first component carrier. Subsequently, the UE may receive one or more repetitions of a control message (e.g., repetitions of downlink control information (DCI)) within the PDCCH candidates which schedule a communication within the first component carrier. A UE that successfully decodes at least one of the linked decoding candidates receives at least one repetition of a control message for cross-carrier scheduling.

A method for wireless communication at a UE is described. The method may include receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, receiving, from the base station and based on the scheduling configuration, at least one repetition of a control message in the first downlink control channel candidate or the second downlink control channel candidate, the control message scheduling a communication between the base station and the UE over the first component carrier, and transmitting or receiving the communication with the base station over the first component carrier.

An apparatus for wireless communication at a UE is described. The apparatus may include a processor, memory coupled with the processor, and instructions stored in the memory. The instructions may be executable by the processor to cause the apparatus to receive, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, receive, from the base station and based on the scheduling configuration, at least one repetition of a control message in the first downlink control channel candidate or the second downlink control channel candidate, the control message scheduling a communication between the base station and the UE over the first component carrier, and transmit or receive the communication with the base station over the first component carrier.

Another apparatus for wireless communication at a UE is described. The apparatus may include means for receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, means for receiving, from the base station and based on the scheduling configuration, at least one repetition of a control message in the first downlink control channel candidate or the second downlink control channel candidate, the control message scheduling a communication between the base station and the UE over the first component carrier, and means for transmitting or receiving the communication with the base station over the first component carrier.

A non-transitory computer-readable medium storing code for wireless communication at a UE is described. The code may include instructions executable by a processor to receive, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, receive, from the base station and based on the scheduling configuration, at least one repetition of a control message in the first downlink control channel candidate or the second downlink control channel candidate, the control message scheduling a communication between the base station and the UE over the first component carrier, and transmit or receive the communication with the base station over the first component carrier.

Some examples of the method, apparatuses, and non-transitory computer-readable medium described herein may further include operations, features, means, or instructions for receiving, via the scheduling configuration, an indication of a first search space set associated with the first downlink control channel candidate and a second search space set associated with the second downlink control channel candidate and monitoring the first search space set and the second search space set based on the indication of the first search space set and the second search space set, where receiving the at least one repetition of the control message may be based on the monitoring.

Some examples of the method, apparatuses, and non-transitory computer-readable medium described herein may further include operations, features, means, or instructions for receiving, via the scheduling configuration, an indication of a first subcarrier spacing (SCS) of the first component carrier and a second SCS of the second or third component carrier, where the monitoring may be based on the indication of the first SCS and the second SCS.

In some examples of the method, apparatuses, and non-transitory computer-readable medium described herein, the first SCS and the second SCS may be the same and the method, apparatuses, and non-transitory computer-readable medium may include further operations, features, means, or instructions for receiving, via the scheduling configuration, an indication of a periodicity associated with both the first search space set and the second search space set, where the monitoring may be based on the periodicity.

In some examples of the method, apparatuses, and non-transitory computer-readable medium described herein, the first SCS may be different from the second SCS and the method, apparatuses, and non-transitory computer-readable medium may include further operations, features, means, or instructions for receiving, via the scheduling configuration, an indication of a first periodicity associated with the first search space set and a second periodicity associated with the second search space set, where the first periodicity may be different from the second periodicity, where the monitoring may be based on the first periodicity, the second periodicity, or both.

In some examples of the method, apparatuses, and non-transitory computer-readable medium described herein, a first ratio between the first SCS and the second SCS may be the same as a second ratio between the first periodicity and the second periodicity.

In some examples of the method, apparatuses, and non-transitory computer-readable medium described herein, the first search space set includes a first quantity of downlink control channel candidates including the first downlink control channel candidate, and the second search space set includes a second quantity of downlink control channel candidates including the second downlink control channel candidate and the first quantity and the second quantity may be the same.

In some examples of the method, apparatuses, and non-transitory computer-readable medium described herein, the first search space set and the second search space set may be associated with a common search space set index.

Some examples of the method, apparatuses, and non-transitory computer-readable medium described herein may further include operations, features, means, or instructions for receiving, via the scheduling configuration, an indication of a third search space set associated with the first component carrier, the third search space set associated with the common search space set index, where monitoring the first search space set and the second search space set may be based on the first search space set, the second search space set, and the third search space set being associated with the common search space set index.

In some examples of the method, apparatuses, and non-transitory computer-readable medium described herein, receiving the at least one repetition of the control message may include operations, features, means, or instructions for receiving a first repetition of the control message in the first downlink control channel candidate and receiving a second repetition of the control message in the second downlink control channel candidate, where transmitting or receiving the communication may be based on receiving the first repetition of the control message, the second repetition of the control message, or both.

Some examples of the method, apparatuses, and non-transitory computer-readable medium described herein may further include operations, features, means, or instructions for performing soft-combining of a first signal corresponding to the first downlink control channel candidate with a second signal corresponding to the second downlink control channel candidate to decode the control message.

Some examples of the method, apparatuses, and non-transitory computer-readable medium described herein may further include operations, features, means, or instructions for identifying one of the first downlink control channel candidate or the second downlink control channel candidate as a reference downlink control channel candidate.

Some examples of the method, apparatuses, and non-transitory computer-readable medium described herein may further include operations, features, means, or instructions for receiving, via the scheduling configuration, an indication of the reference downlink control channel candidate, where identifying one of the first downlink control channel candidate or the second downlink control channel candidate as the reference downlink control channel candidate may be based on the scheduling configuration.

In some examples of the method, apparatuses, and non-transitory computer-readable medium described herein, the first downlink control channel candidate may be associated with a first search space set and the second downlink control channel candidate may be associated with a second search space set and the method, apparatuses, and non-transitory computer-readable medium may include further operations, features, means, or instructions for identifying one of the first downlink control channel candidate or the second downlink control channel candidate as the reference downlink control channel candidate based on a one or more parameters associated with the first component carrier, the second component carrier, the third component carrier, or any combination thereof, the one or more parameters including a component carrier index, a SCS, or both.

Some examples of the method, apparatuses, and non-transitory computer-readable medium described herein may further include operations, features, means, or instructions for identifying one of the first downlink control channel candidate or the second downlink control channel candidate as the reference downlink control channel candidate based on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

Some examples of the method, apparatuses, and non-transitory computer-readable medium described herein may further include operations, features, means, or instructions for transmitting a feedback message responsive to the at least one repetition of the control message within a resource which may be determined based on the reference downlink control channel candidate.

Some examples of the method, apparatuses, and non-transitory computer-readable medium described herein may further include operations, features, means, or instructions for transmitting a feedback message with a payload size that may be determined based on a downlink assignment index (DAI), where the DAI may be based on the reference downlink control channel candidate.

In some examples of the method, apparatuses, and non-transitory computer-readable medium described herein, transmitting or receiving the communication may include operations, features, means, or instructions for transmitting or receiving the communication with the base station within a slot that may be offset relative to the reference downlink control channel candidate.

In some examples of the method, apparatuses, and non-transitory computer-readable medium described herein, transmitting or receiving the communication may include operations, features, means, or instructions for transmitting or receiving the communication with the base station based on a beam which may be determined based on the reference downlink control channel candidate.

In some examples of the method, apparatuses, and non-transitory computer-readable medium described herein, transmitting or receiving the communication may include operations, features, means, or instructions for transmitting or receiving the communication based on a preparation time associated with the communication which may be determined based on the reference downlink control channel candidate, a channel state information (CSI) computation time associated with the communication which may be determined based on the reference downlink control channel candidate, or both.

In some examples of the method, apparatuses, and non-transitory computer-readable medium described herein, the control message includes a DCI message.

Some examples of the method, apparatuses, and non-transitory computer-readable medium described herein may further include operations, features, means, or instructions for transmitting or receiving the communication may be based on the at least one repetition of the control message.

A method for wireless communication at a base station is described. The method may include transmitting, to a UE, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, transmitting, to the UE and based on the scheduling configuration, at least one repetition of a control message in the first downlink control channel candidate or the second downlink control channel candidate, the control message scheduling a communication between the base station and the UE over the first component carrier, and transmitting or receiving the communication with the UE over the first component carrier.

An apparatus for wireless communication at a base station is described. The apparatus may include a processor, memory coupled with the processor, and instructions stored in the memory. The instructions may be executable by the processor to cause the apparatus to transmit, to a UE, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, transmit, to the UE and based on the scheduling configuration, at least one repetition of a control message in the first downlink control channel candidate or the second downlink control channel candidate, the control message scheduling a communication between the base station and the UE over the first component carrier, and transmit or receive the communication with the UE over the first component carrier.

Another apparatus for wireless communication at a base station is described. The apparatus may include means for transmitting, to a UE, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, means for transmitting, to the UE and based on the scheduling configuration, at least one repetition of a control message in the first downlink control channel candidate or the second downlink control channel candidate, the control message scheduling a communication between the base station and the UE over the first component carrier, and means for transmitting or receiving the communication with the UE over the first component carrier.

A non-transitory computer-readable medium storing code for wireless communication at a base station is described. The code may include instructions executable by a processor to transmit, to a UE, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier, transmit, to the UE and based on the scheduling configuration, at least one repetition of a control message in the first downlink control channel candidate or the second downlink control channel candidate, the control message scheduling a communication between the base station and the UE over the first component carrier, and transmit or receive the communication with the UE over the first component carrier.

Some examples of the method, apparatuses, and non-transitory computer-readable medium described herein may further include operations, features, means, or instructions for transmitting, via the scheduling configuration, an indication of a first search space set associated with the first downlink control channel candidate and a second search space set associated with the second downlink control channel candidate, where transmitting the at least one repetition of the control message may be based on the first search space set, the second search space set, or both.

Some examples of the method, apparatuses, and non-transitory computer-readable medium described herein may further include operations, features, means, or instructions for transmitting, via the scheduling configuration, an indication of a first SCS of the first component carrier and a second SCS of the second or third component carrier, where transmitting the at least one repetition of the control message may be based on the first SCS, the second SCS, or both.

In some examples of the method, apparatuses, and non-transitory computer-readable medium described herein, the first SCS and the second SCS may be the same and the method, apparatuses, and non-transitory computer-readable medium may include further operations, features, means, or instructions for transmitting, via the scheduling configuration, an indication of a periodicity associated with both the first search space set and the second search space set, where transmitting the at least one repetition of the control message may be based on the periodicity.

In some examples of the method, apparatuses, and non-transitory computer-readable medium described herein, the first SCS may be different from the second SCS and the method, apparatuses, and non-transitory computer-readable medium may include further operations, features, means, or instructions for transmitting, via the scheduling configuration, an indication of a first periodicity associated with the first search space set and a second periodicity associated with the second search space set, where the first periodicity may be different from the second periodicity, where transmitting the at least one repetition of the control message may be based on the first periodicity, the second periodicity, or both.

In some examples of the method, apparatuses, and non-transitory computer-readable medium described herein, a first ratio between the first SCS and the second SCS may be the same as a second ratio between the first periodicity and the second periodicity.

In some examples of the method, apparatuses, and non-transitory computer-readable medium described herein, the first search space set includes a first quantity of downlink control channel candidates including the first downlink control channel candidate, and the second search space set includes a second quantity of downlink control channel candidates including the second downlink control channel candidate and the first quantity and the second quantity may be the same.

In some examples of the method, apparatuses, and non-transitory computer-readable medium described herein, the first search space set and the second search space set may be associated with a common search space set index.

Some examples of the method, apparatuses, and non-transitory computer-readable medium described herein may further include operations, features, means, or instructions for transmitting, via the scheduling configuration, an indication of a third search space set associated with the first component carrier, the third search space set associated with the common search space set index.

In some examples of the method, apparatuses, and non-transitory computer-readable medium described herein, transmitting the at least one repetition of the control message may include operations, features, means, or instructions for transmitting a first repetition of the control message in the first downlink control channel candidate and transmitting a second repetition of the control message in the second downlink control channel candidate, where transmitting or receiving the communication may be based on transmitting the first repetition of the control message, the second repetition of the control message, or both.

Some examples of the method, apparatuses, and non-transitory computer-readable medium described herein may further include operations, features, means, or instructions for identifying one of the first downlink control channel candidate or the second downlink control channel candidate as a reference downlink control channel candidate.

Some examples of the method, apparatuses, and non-transitory computer-readable medium described herein may further include operations, features, means, or instructions for transmitting, via the scheduling configuration, an indication of the reference downlink control channel candidate, where identifying one of the first downlink control channel candidate or the second downlink control channel candidate as the reference downlink control channel candidate may be based on the scheduling configuration.

In some examples of the method, apparatuses, and non-transitory computer-readable medium described herein, the first downlink control channel candidate may be associated with a first search space set and the second downlink control channel candidate may be associated with a second search space set and the method, apparatuses, and non-transitory computer-readable medium may include further operations, features, means, or instructions for identifying one of the first downlink control channel candidate or the second downlink control channel candidate as the reference downlink control channel candidate based on one or more parameters associated with the first component carrier, the second component carrier, the third component carrier, or any combination thereof, the one or more parameters including a component carrier index, a SCS, or both.

Some examples of the method, apparatuses, and non-transitory computer-readable medium described herein may further include operations, features, means, or instructions for identifying one of the first downlink control channel candidate or the second downlink control channel candidate as the reference downlink control channel candidate based on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

Some examples of the method, apparatuses, and non-transitory computer-readable medium described herein may further include operations, features, means, or instructions for receiving a feedback message responsive to the at least one repetition of the control message within a resource which may be determined based on the reference downlink control channel candidate.

Some examples of the method, apparatuses, and non-transitory computer-readable medium described herein may further include operations, features, means, or instructions for receiving a feedback message with a payload size that may be determined based on a DAI, where the DAI may be based on the reference downlink control channel candidate.

In some examples of the method, apparatuses, and non-transitory computer-readable medium described herein, transmitting or receiving the communication may include operations, features, means, or instructions for transmitting or receiving the communication with the UE within a slot that may be offset relative to the reference downlink control channel candidate.

In some examples of the method, apparatuses, and non-transitory computer-readable medium described herein, transmitting or receiving the communication may include operations, features, means, or instructions for transmitting or receiving the communication with the UE based on a beam which may be determined based on the reference downlink control channel candidate.

In some examples of the method, apparatuses, and non-transitory computer-readable medium described herein, transmitting or receiving the communication may include operations, features, means, or instructions for transmitting or receiving the communication based on a preparation time associated with the communication which may be determined based on the reference downlink control channel candidate, a CSI computation time associated with the communication which may be determined based on the reference downlink control channel candidate, or both.

In some examples of the method, apparatuses, and non-transitory computer-readable medium described herein, the control message includes a DCI message.

Some examples of the method, apparatuses, and non-transitory computer-readable medium described herein may further include operations, features, means, or instructions for transmitting or receiving the communication may be based on the at least one repetition of the control message.

DETAILED DESCRIPTION

Figure 1:
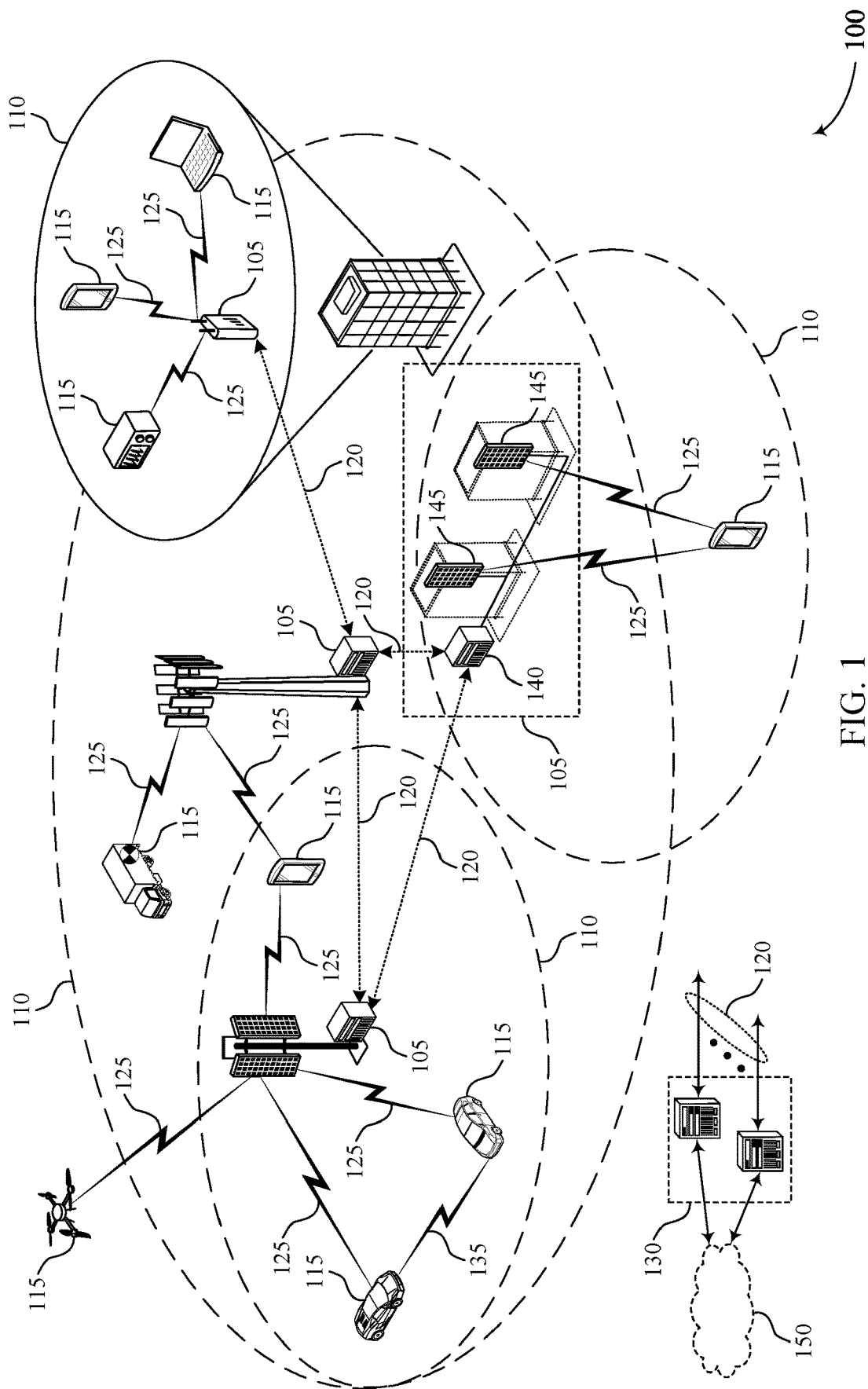
FIG. 1 illustrates an example of a wireless communications system that supports techniques for control channel repetition across component carriers in accordance with aspects of the present disclosure.

Some wireless systems may enable communications within a component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). A carrier indicator field (CIF) within control signaling (e.g., downlink control information (DCI) messages) may indicate whether the control signaling is scheduling communications within the same component carrier or a different component carrier. In some wireless communications systems, a single component carrier may be scheduled via control signaling received on multiple component carriers. That is, a "scheduled component carrier" may be scheduled via control signaling on multiple "scheduling component carriers." However, in these wireless communications systems, each individual communication on the scheduled component carrier may only be scheduled via control signaling on a single scheduling component carrier. As such, if a DCI message which schedules a communication over a scheduled component carrier is impaired or otherwise interfered with, the communication scheduled by the DCI may not be successfully scheduled or performed.

Accordingly, aspects of the present disclosure provide techniques for control channel repetition (e.g., physical downlink control channel (PDCCH) repetition) across multiple component carriers for cross-carrier scheduling. In particular, techniques described herein support techniques for "linking" PDCCH candidates across multiple scheduling component carriers for PDCCH repetition, where the multiple PDCCH candidates may be used to schedule communications within a scheduled component carrier. A user equipment (UE) may attempt to decode signals received within each of the PDCCH candidates of a search space set to determine if a cyclic redundancy check (CRC) passes for any of the candidates.

For example, a UE may receive a scheduling configuration which indicates multiple PDCCH candidates for scheduling communications on a first component carrier ("scheduled component carrier"), where the multiple PDCCH candidates are linked for PDCCH repetition. For instance, a first PDCCH candidate and a second PDCCH candidate may be positioned within a second component carrier and a third component carrier, respectively ("scheduling component carriers"). In other cases, at least one PDCCH candidate may be positioned within the first component carrier. Subsequently, the UE may receive one or more repetitions of a control message (e.g., repetitions of DCI) within the PDCCH candidates which schedule a communication (e.g., physical downlink shared channel (PDSCH) communication, physical uplink shared channel (PUSCH) communication) within the first component carrier. A UE that successfully decodes at least one of the linked decoding candidates receives at least one repetition of a control message for cross-carrier scheduling.

In some aspects, the scheduling configuration may indicate various parameters associated with scheduling communications on the first component carrier, including search space sets for the respective physical uplink control channel (PUCCH) candidates, periodicities of the respective search space sets, subcarrier spacings (SCSs) of the search space sets, and the like. In some implementations, the UE may be configured to identify one of the PDCCH candidates as a "reference" PDCCH candidate (e.g., via the scheduling configuration, via pre-defined rules). The UE may then be configured to transmit feedback and/or determine parameters for the scheduled communication based on the determined reference PDCCH candidate.

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for control channel repetition across component carriers.

FIG. 1 illustrates an example of a wireless communications system 100 that supports techniques for control channel repetition across component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured with up to three CORESETS within a given BWP of a serving cell (e.g., within a given BWP of a component carrier). In some cases (e.g., Release 16), a UE 115 may be configured with up to five CORESETs in a BWP of a serving cell. A CORESET may be associated with one or more transmission configuration indicator (TCI) states for PDCCH repetition, and may be associated with a quantity of resource blocks (RBs) in the frequency domain, and a quantity of symbols or other TTI in the time domain (e.g., quantity of OFDM symbols). Moreover, each CORESET may be associated with one active TCI state. In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with a one CORESET, and may include a set of monitoring occasions. In some aspects, a search space set may include a set of control channel monitoring occasions. For example, a search space set may include a set of monitoring occasions, with a monitoring occasion occurring at regular or irregular periodicities (e.g., monitoring occasion every 10 ms). The UE 115 may be configured to blindly decode signals received in the respective monitoring occasions to determine whether CRC passes in the respective monitoring occasions. Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105 (e.g., via RRC signaling), or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s < k_s$), or any combination thereof. A UE 115 of the wireless communications system 100 may determine a number/quantity of PDCCH monitoring occasions (e.g., PDCCH candidates) within a slot $\eta_{s,f}^{\mu}$ and a frame $\eta_f$ if $\eta_f N_{slot}^{frame,\mu} + \eta_{s,f}^{\mu} o_s \mod k_s = 0$. In some aspects, when monitoring a control channel, a UE 115 may be configured to monitor control channel candidates (e.g., PDCCH candidates) for a search space set s for $T_s$ consecutive slots, starting from slot $\eta_{s,f}^{\mu}$, and may refrain from monitoring control channel candidates for the search space set s for the next $k_s - T_s$ consecutive slots. Quantities of control channel candidates (e.g., PDCCH candidates) may be based on an aggregation level (e.g., number of CCEs) of wireless communications at the UE 115.

These search space set parameters may be configured (e.g., pre-configured) at the UE 115, indicated to the UE 115 via a base station 105 (e.g., via RRC signaling), or both. For example, RRC signaling may be used to configure parameters of a search space set at a UE 115, including with which CORESET the search space set is associated, a periodicity of monitoring occasions of the search space set, an offset of the monitoring occasions, DCI formats to monitor, a number of PDCCH candidates for a given aggregation level of the search space set, and the like.

Each search space set may be associated with a search space set index. In some implementations, PDCCH candidates may be defined as part of the search space set configuration. For example, a search space set may include a set of PDCCH candidates, where each PDCCH candidate is associated with a given aggregation level and candidate index. In some aspects, a UE 115 may be configured to monitor PDCCH candidates in configured search space sets. The UE 115 may be configured to blindly decode the PDCCH candidates (e.g., monitoring occasions) within a search space set. In cases where the UE 115 receives a DCI message within a PDCCH candidate, the UE 115 may identify a CRC pass for the UE 115 (e.g., successfully decoding), and the UE 115 may act in accordance with the received DCI message (e.g., perform a communication scheduled by the DCI message).

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol (s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions (e.g., PDCCH candidates) within each slot that the search space set exists. Moreover, the UE 115 may be configured to determine that the three monitoring occasions begin at the second, seventh, and eleventh symbols of each respective slot that the search space exists.

In some aspects, multiple search space sets and/or multiple PDCCH candidates may be linked together (e.g., associated with one another) for possible repetitions of the same control channel transmission (e.g., repetitions of DCI). PDCCH candidates which are linked together may be used to transmit/receive repetitions of the same control message. In other words, PDCCH candidates may be linked together for "PDCCH repetitions." In the context of PDCCH repetitions, the payload (e.g., DCI payload) received within two PDCCH candidates (e.g., two PDCCH repetitions) may be the same. For example, a first PDCCH candidate may be related to, or linked with, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally or alternatively, the UE 115 may receive and/or decode both the first and second repetitions of DCI by performing soft-combining of the first and second repetitions of DCI, and the UE may be aware of the linking before decoding. In some aspects, related/linked PDCCH candidates may have the same aggregation level (e.g., same number of CCEs).

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

The wireless communications system 100 may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., PDSCH, PUSCH) on a different component carrier (e.g., scheduled component carrier, scheduled cell). Conversely, intra-carrier scheduling, or self-scheduling, refers to cases in which control signaling transmitted/received on a component carrier is used to schedule communications on the same component carrier (e.g., same cell).

In some aspects, a search space set may include control channel candidates (e.g., PDCCH candidates) which are configured for self-scheduling, cross-carrier scheduling, or both. The CCEs associated with control channel candidates for different scheduled component carriers (e.g., PDCCH candidates for self-scheduling, PDCCH candidates for cross-carrier scheduling) within a monitoring occasion of a search space set may be separately identified based on a number of candidates for each aggregation level. The number/quantity of candidates for each aggregation level may be configured in a scheduled component carrier, and may be monitored in the scheduling component carrier. For example, a monitoring occasion for a search space set includes a set of PDCCH candidates with an aggregation level of two (e.g., two CCEs for each PDCCH candidate). In this example, the set of PDCCH candidates may include a first subset of PDCCH candidates configured for self-scheduling (e.g., subset of PDCCH candidates with CIF=0), and a second subset of PDCCH candidates for cross-carrier scheduling (e.g., subset of PDCCH candidates with CIF=1). In this regard, a single search space set may include PDCCH candidates which are configured for self-scheduling, cross-carrier scheduling, or both.

In some wireless communications systems, a single scheduled component carrier may not be scheduled via control signaling received on more than one scheduling component carrier. That is, some wireless communications systems may enable each scheduled component carrier to be scheduled via one scheduling component carrier. In other wireless communications systems, a single component carrier may be scheduled via control signaling received on multiple component carriers. That is, a scheduled component carrier may be scheduled via control signaling on multiple scheduling component carriers. As such, communications on both PCell/PSCell and SCell may be used to schedule communications on the PCell for DCI formats (e.g., DCI formats 0_1, 1_1, 0_2, 1_2). However, in some wireless communications systems, each individual communication on the scheduled component carrier may only be scheduled via control signaling on a single scheduling component carrier. Stated differently, a single PUSCH transmission on a scheduled component carrier may not be scheduled via control signaling received on multiple scheduling component carriers. As such, if a DCI message which schedules a communication over a scheduled component carrier is impaired or otherwise interfered with, the communication scheduled by the DCI may not be successfully scheduled or performed.

Accordingly, the UEs 115 and the base stations 105 of the wireless communications system 100 may support techniques for control channel repetition (e.g., PDCCH repetition) across multiple component carriers for cross-carrier scheduling. In particular, techniques described herein support techniques for "linking" PDCCH candidates across multiple scheduling component carriers for PDCCH repetition, where the multiple PDCCH candidates may be used to schedule communications within a scheduled component carrier. As such, techniques described herein may enable a communication on a scheduled component carrier to be scheduled by repetitions of control messages transmitted/received across multiple scheduling component carriers.

For example, a UE 115 of the wireless communications system 100 may receive a scheduling configuration which indicates multiple PDCCH candidates for scheduling communications on a first component carrier (e.g., scheduled component carrier), where the multiple PDCCH candidates are linked for PDCCH repetition. For instance, a first PDCCH candidate and a second PDCCH candidate may be positioned within a second component carrier and a third component carrier, respectively (e.g., scheduling component carriers). In other cases, at least one PDCCH candidate may be positioned within the first component carrier. In other words, in some cases, the first component carrier may be both the scheduled component carrier and one of the scheduling component carriers. In cases where cross carrier scheduling of a scheduling component carrier (e.g., PCell, PSCell) via control channel repetition on two or more scheduling component carriers (e.g., scheduling SCells (sSCell)) is configured, the UE 115 may be configured to monitor for control messaging (e.g., monitor DCI formats 0_1, 1_1, 0_2, 1_2) on the scheduling component carriers which schedule PDSCH/PUSCH communications on the UE-specific search space sets of the scheduled component carrier (e.g., PCell, PSCell). Subsequently, the UE 115 may receive one or more repetitions of a control message (e.g., repetitions of DCI) within the PDCCH candidates which schedule a communication (e.g., PDSCH communication, PUSCH communication) within the first component carrier.

In some aspects, the scheduling configuration may indicate various parameters associated with scheduling communications on the first component carrier, including search space sets for the respective PUCCH candidates, periodicities of the respective search space sets, SCSs of the search space sets, and the like. In some implementations, the UE 115 may be configured to identify one of the PDCCH candidates as a "reference" PDCCH candidate (e.g., via the scheduling configuration, via pre-defined rules). The UE 115 may then be configured to transmit feedback and/or determine parameters for the scheduled communication based on the determined reference PDCCH candidate.

Techniques described herein may provide for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

Figure 2:
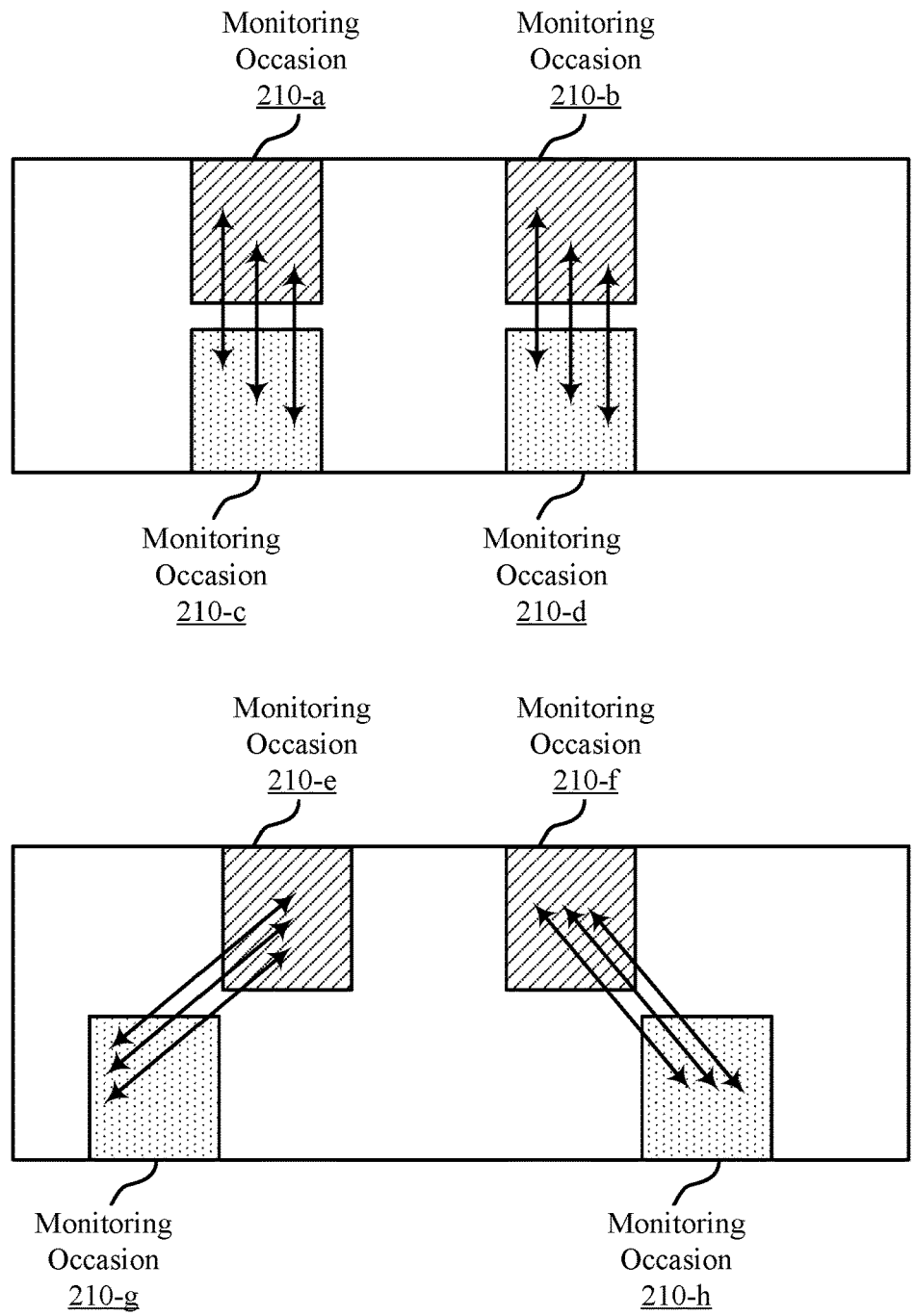
FIG. 2 illustrates an example of a resource configuration that supports techniques for control channel repetition across component carriers in accordance with aspects of the present disclosure.

FIG. 2 illustrates an example of a resource configuration 200 that supports techniques for control channel repetition across component carriers in accordance with aspects of the present disclosure. Aspects of the resource configuration 200 may implement, or be implemented by, wireless communications system 100.

As noted previously herein, multiple search space sets 205 may be linked together for control channel repetition (e.g., PDCCH repetition). For example, as shown in the resource configuration 200, a first search space set 205-a may be linked to a second search space set 205-b. In particular, monitoring occasions 210 associated with the first search space set 205-a (e.g., monitoring occasions 210-a, 210-b, 210-e, 210-f) may be linked with monitoring occasions 210 associated with the second search space set 205-b (e.g., monitoring occasions 210-c, 210-d, 210-g, 210-h). In some aspects, related PDCCH candidates in the respective search space sets 205 (e.g., PDCCH candidates within the monitoring occasions 210 of the respective search space sets 205) which are associated with corresponding CORESETs may be linked together (e.g., related) for PDCCH repetition.

In some cases, two PDCCH candidates with a same candidate index across two related search space sets 205 may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

Associations (e.g., links) between search space sets 205 and/or between PDCCH candidates may be configured (e.g., pre-configured) at the UE 115, signaled to the UE 115 by the base station 105 (e.g., via RRC signaling), or both. For example, a UE 115 may receive an RRC message which indicates that a first PDCCH candidate in the first search space set 205-a is linked with (e.g., related to) a second PDCCH candidate in the second search space set 205-b. By way of another example, a UE 115 may receive an RRC message which indicates that the first search space set 205-a is linked with (e.g., related to) a second search space set 205-b for PDCCH repetition. In this example, PDCCH candidates with the same aggregation level and same candidate index between the first and second search space sets 205 may be linked. In particular, the first search space set 205-a and the second search space set 205-b may include a first set of PDCCH candidates (first set of monitoring occasions 210) and a second set of PDCCH candidates (second set of monitoring occasions 210), respectively, where the first set of PDCCH candidates are linked to the second set of PDCCH candidates.

In some cases, the first and second sets of monitoring occasions 210 may include the same number of monitoring occasions/PDCCH candidates (e.g., one-to-one mapping of monitoring occasions 210). For example, the monitoring occasion 210-a associated with the first search space set 205-a may include the same number of PDCCH candidates as the monitoring occasion 210-c associated with the second search space set 205-b. Similarly, the monitoring occasions 210-b, 210-e, and 210-f associated with the first search space set may include the same number of PDCCH candidates as the monitoring occasions 210-d, 210-g, and 210-h associated with the second search space set 205-b, respectively. Moreover, the first and second search space sets 205-a, 205-b may be configured with the same number of PDCCH candidates for each aggregation level.

In some aspects, aspects of the resource configuration 200 may support techniques for control channel repetition (e.g., PDCCH repetition) across multiple component carriers for cross-carrier scheduling. In particular, aspects of the resource configuration 200 may be used for "linking" PDCCH candidates across multiple scheduling component carriers (e.g., across multiple search space sets 205) for PDCCH repetition, where the multiple PDCCH candidates may be used to schedule communications within a scheduled component carrier.

Figure 3:
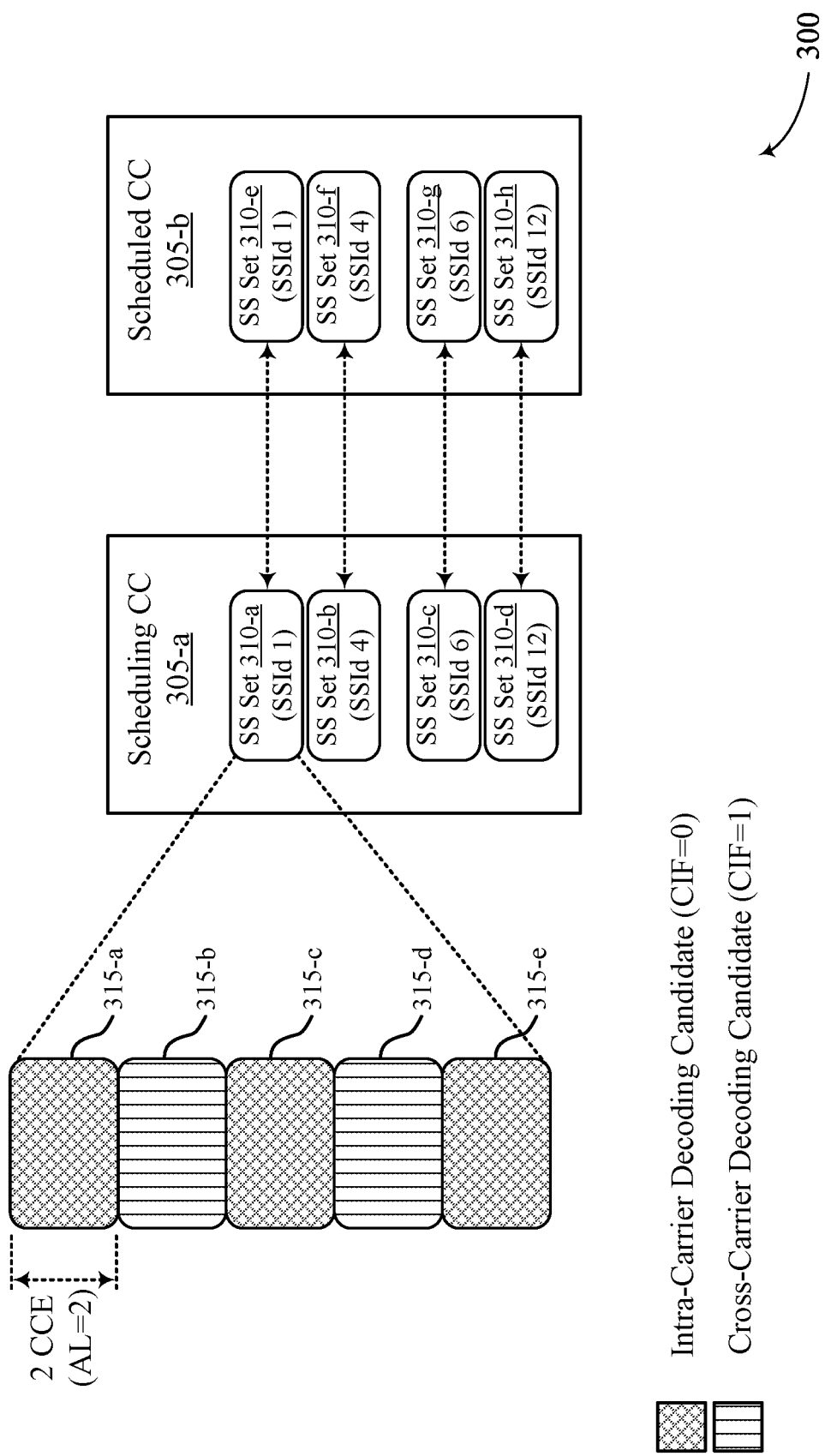
FIG. 3 illustrates an example of a resource configuration that supports techniques for control channel repetition across component carriers in accordance with aspects of the present disclosure.

FIG. 3 illustrates an example of a resource configuration 300 that supports techniques for control channel repetition across component carriers in accordance with aspects of the present disclosure. Aspects of the resource configuration 200 may implement, or be implemented by, wireless communications system 100, resource configuration 200, or both. The resource configuration 300 illustrates configurations for intra-carrier and inter-carrier (e.g., cross-carrier) scheduling.

In some aspects, some wireless communications systems (e.g., wireless communications system 100) may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., PDSCH, PUSCH) on a different component carrier (e.g., scheduled component carrier, scheduled cell). Conversely, intra-carrier scheduling, or self-scheduling, refers to cases in which control signaling transmitted/received on a component carrier is used to schedule communications on the same component carrier (e.g., same cell).

For example, as shown in resource configuration 300, a scheduling component carrier 305-a may be associated with search space sets 310-a, 310-b, 310-c, 310-d which are configured to schedule communications on a scheduled component carrier 305-*b*. In this regard, the search space sets 310 of the scheduling component carrier 305-*a* may be configured for cross-carrier scheduling on the scheduled component carrier 305-*b*.

In some implementations, search space sets 310 with the same search space set index (searchSpaceId) within the scheduling component carrier 305-*a* (e.g., scheduling cell) and the scheduled component carrier 305-*b* (e.g., scheduled cell) may be associated with (e.g., linked to) one another. For example, the first search space set 310-*a* with a first search space set index (e.g., searchSpaceId=1) on the scheduling component carrier 305-*a* may be linked to the second search space set 310-*e* with the first search space set index (e.g., searchSpaceId=1) on the scheduled component carrier 305-*b* for cross-carrier scheduling. In particular, search space sets 310 within the scheduled component carrier 305-*b* may be linked to search space sets 310 within the scheduling component carrier 305-*a*, where the configuration of the search space sets 310 within the scheduled component carrier 305-*b* may be used to determine the number of decoding candidates which are to be monitored within the scheduling component carrier 305-*a*.

As such, the terms "linked," "linking," and like terms, may be used throughout the present disclosure in two different contexts. First, related PDCCH candidates within different search space sets 310 may be said to be "linked" for PDCCH repetition, in which case multiple repetitions of the same control message may be transmitted/received within the linked PDCCH candidates. Second, search space sets 310 within a scheduled component carrier 305 may be said to be "linked" to search space sets 310 within a scheduling component carrier 305 for cross-carrier scheduling, in which case the configuration of the search space sets 310 within the scheduled component carrier 305 may be used to determine the number of decoding candidates which are to be monitored within the search space sets 310 of the scheduling component carrier 305.

In some aspects, cross-carrier scheduling may be performed only if the BWPs associated with linked search space sets 310 in scheduling component carrier 305-*a* and the scheduled component carrier 305-*b* are both active. Stated differently, and continuing with the example above, a UE 115 may be configured to apply a search space set 310 in the scheduling component carrier 305-*a* for scheduling the scheduled component carrier 305-*b* only if the downlink BWPs in which the linked search space sets 310 of the scheduled component carrier 305-*b* and the scheduling component carrier 305-*a* are both active.

For example, a UE 115 may be configured with a first search space set 310-*a* on the scheduling component carrier 305-*a* and a second search space set 310-*e* on the scheduled component carrier 305-*b*, where the first and second search space sets 310-*a*, 310-*e* are linked for cross-carrier scheduling. In this example, the UE 115 may be configured to perform cross-carrier scheduling (e.g., apply the first search space set 310-*a* of the scheduling component carrier 305-*a* for the scheduled component carrier 305-*b* for cross-carrier scheduling) only if a first BWP associated with the first search space set 310-*a* and a second BWP associated with the second search space set 310-*e* are both active. In some cases, the first BWP and the second BWP for the linked search space sets 310-*a*, 310-*e* may be the same.

The search space sets 310 of the scheduling component carrier 305-*a* may additionally, or alternatively, be configured for intra-carrier scheduling. In particular, a search space set 310 may include control channel candidates (e.g., PDCCH candidates) which are configured for self-scheduling, cross-carrier scheduling, or both. For example, the first search space set 310-*a* may include a first set of control channel candidates 315-*a*, 315-*c*, 315-*e* (e.g., PDCCH candidates) which are configured for intra-carrier scheduling (e.g., self-scheduling), and a second set of control channel candidates 315-*b*, 315-*d* which are configured for cross-carrier scheduling. In this regard, control signaling performed over the first set of control channel candidates 315-*a*, 315-*c*, 315-*e* may be used to schedule communications over the scheduling component carrier 305-*a*, whereas control signaling performed over the second set of control channel candidates 315-*b*, 315-*d* may be used to schedule communications over the scheduled component carrier 305-*b* (e.g., within the search space set 310-*e*).

In some aspects, a CIF within control signaling (e.g., DCI messages) may indicate whether the control signaling schedules communications within the same or different component carrier 305 on which the control signaling was transmitted/received. For example, a DCI with a CIF value of zero (e.g., CIF=0) may indicate that the DCI schedules a communication on the same component carrier 305 on which the DCI was transmitted/received. In this regard, a CIF value of zero may indicate self-scheduling. By way of another example, a DCI with a non-zero CIF value (e.g., CIF=1, 2, etc.) may indicate that the DCI schedules a communication on a different component carrier 305 from the component carrier 305 on which the DCI was transmitted/received. In this regard, a non-zero CIF value may indicate cross-carrier scheduling.

Moreover, the respective control channel candidates 315 may be associated with respective CIF values used for intra-carrier and cross-carrier scheduling. For example, as shown in resource configuration 300, the first set of control channel candidates 315-*a*, 315-*c*, 315-*e* may be associated with a first CIF value (e.g., CIF=0) configured for intra-carrier scheduling, and the second set of control channel candidates 315-*b*, 315-*d* may be associated with a second CIF value (e.g., CIF=1) configured for cross-carrier scheduling. In some aspects, a CIF may be configured with zero to three bits. In cases where a DCI includes a CIF which is configured with zero bits, the DCI may only support self-scheduling.

The CCEs associated with control channel candidates 315 for different scheduled component carriers 305 (e.g., first set of control channel candidates 315-*a*, 315-*c*, 315-*e* for self-scheduling, second set of control channel candidates 315-*b*, 315-*d* for cross-carrier scheduling) within a monitoring occasion of a search space set 310 may be separately identified based on a number of candidates for each aggregation level. The number of candidates for each aggregation level may be configured in the scheduled component carrier 305-*b*, and may be monitored in the scheduling component carrier 305-*a*. For example, the first search space set 310-*a* may include a monitoring occasion which includes a set of control channel candidates 315 with an aggregation level of two (e.g., two CCEs for each control channel candidate 315). In this example, the set of control channel candidates 315 may include the first subset of control channel candidates 315-*a*, 315-*c*, 315-*e* configured for self-scheduling (e.g., subset of PDCCH candidates with CIF=0), and a second subset of control channel candidates 315-*b*, 315-*d* for cross-carrier scheduling (e.g., subset of PDCCH candidates with CIF=1). In this regard, a single search space set 310 may include PDCCH candidates which are configured for self-scheduling, cross-carrier scheduling, or both. In some examples, time domain behavior, monitoring occasions, DCI formats to monitor, or any combination thereof, may be configured in search space sets 310 of the scheduling cells and the number of candidates for each aggregation level may be configured in a search space set (e.g., the search space set with the same index) of the scheduled cell. For instance, the dotted arrows in FIG. 3 represent the association (linking) of search space sets 310 with the same search space set index in the scheduling cell and the scheduled cell (e.g., linking between the search space set 310-a of the scheduling component carrier 305-a and the search space set 310-e of the scheduled cell).

In some aspects, the scheduled component carrier 305-b (e.g., scheduled cell) may not be configured with a CORESET, but may be configured with search space sets 310 (e.g., search space sets 310-e, 310-f, 310-g, 310-h). For search space sets 310 configured in the scheduled component carrier 305-b, fields associated with search space set indexes (e.g., searchSpaceId), a number of control channel candidates per aggregation level (e.g., nrofCandidates) may be configured. Comparatively, other fields for search space sets 310 configured in the scheduled component carrier 305-b may be absent, or not configured, including fields associated with CORESETs, fields associated with time domain properties (e.g., periodicity, offset, duration, monitoring symbols per slot), fields associated with DCI formats to monitor, and the like. In particular, these fields (except for fields relating to a number of control channel candidates for each aggregation level) may be defined for a search space set 310 of the scheduling component carrier 305-a (e.g., the search space set with the same index) which schedules the respective scheduled component carrier 305-b.

In some aspects, aspects of the resource configuration 300 may support techniques for control channel repetition (e.g., PDCCH repetition) across multiple component carriers 305 for cross-carrier scheduling. In particular, aspects of the resource configuration 300 may be used for "linking" PDCCH candidates (e.g., control channel candidates 315) across multiple scheduling component carriers 305 (e.g., across multiple search space sets 310) for PDCCH repetition, where the multiple PDCCH candidates may be used to schedule communications within a scheduled component carrier 305 (e.g., scheduled component carrier 305-b).

Figure 4:
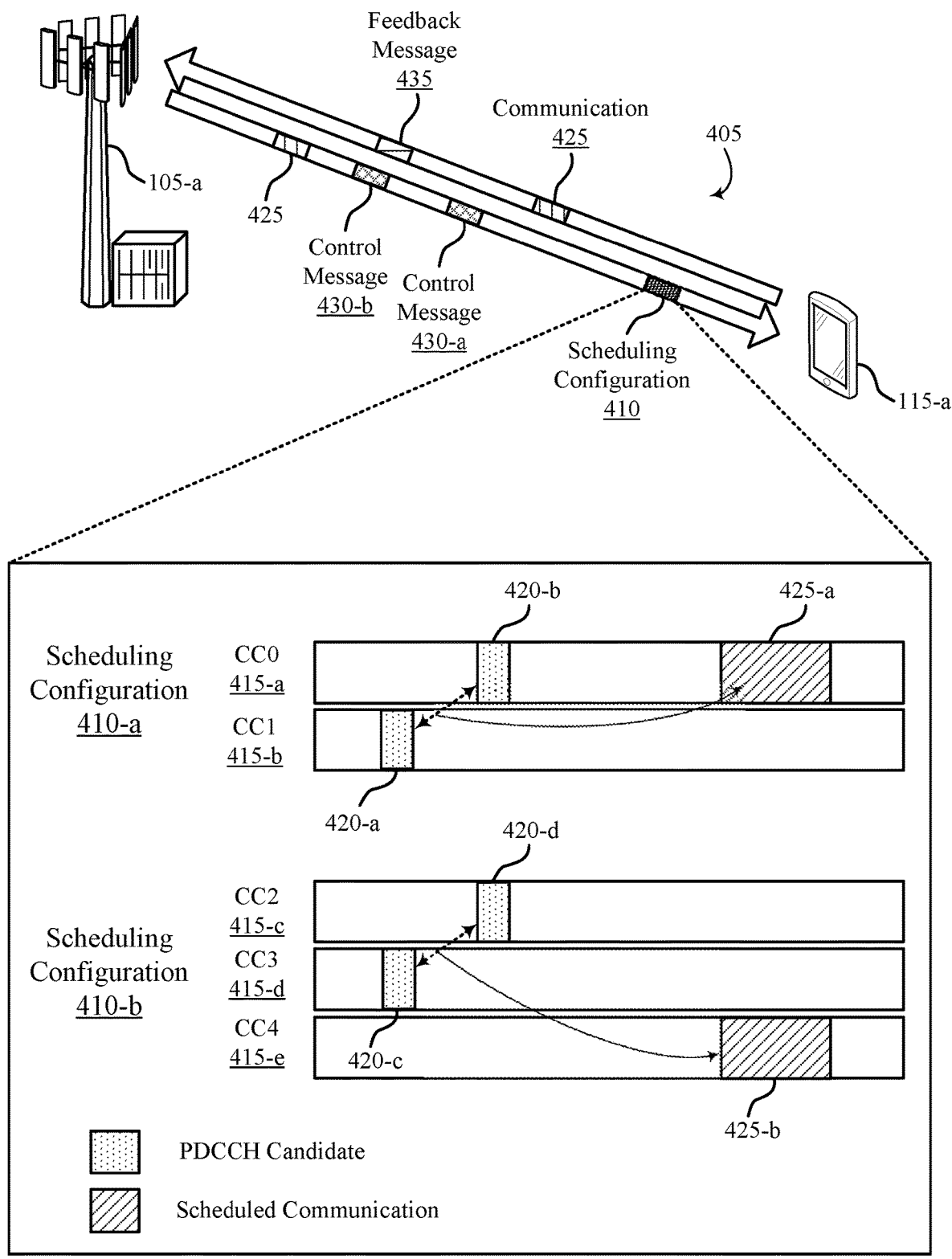
FIG. 4 illustrates an example of a wireless communications system that supports techniques for control channel repetition across component carriers in accordance with aspects of the present disclosure.

FIG. 4 illustrates an example of a wireless communications system 400 that supports techniques for control channel repetition across component carriers in accordance with aspects of the present disclosure. In some examples, wireless communications system 400 may implement, or be implemented by, aspects of wireless communications system 100, resource configuration 200, resource configuration 300, or any combination thereof. For example, wireless communications system 400 may support control channel repetition for cross-carrier scheduling, as described in FIGS. 1-3.

The wireless communications system 400 may include a base station 105-a and a UE 115-a, which may be examples of base stations 105 and UEs 115 as described with reference to FIG. 1. The UE 115-a may communicate with the base station 105-a using a communication link 405, which may be an example of an NR or LTE link between the UE 115-a and the base station 105-a. In some cases, the communication link 405 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals, to the base station 105-a using the communication link 405 and the base station 105-a may transmit downlink signals, such as downlink control signals or downlink data signals, to the UE 115-a using the communication link 405.

In some aspects, the UE 115-a and the base station 105-a of the wireless communications system 400 may support techniques for control channel repetition (e.g., PDCCH repetition) across multiple component carriers for cross-carrier scheduling. In particular, techniques described herein support techniques for "linking" PDCCH candidates across multiple scheduling component carriers for PDCCH repetition, where the multiple PDCCH candidates may be used to schedule communications within a scheduled component carrier. As such, techniques described herein may enable a communication on a scheduled component carrier to be scheduled by repetitions of control messages transmitted/received across multiple scheduling component carriers.

In some instances, a UE 115 may be configured with cross-carrier scheduling such that two different scheduling component carriers are configured to schedule one scheduled component carrier, and two search space sets on the two scheduling component carriers can be linked for PDCCH repetition to schedule PDSCH and/or PUSCH on the scheduled cell. One PDCCH candidate in a monitoring occasion of a first search space set on a first scheduling component carrier may be linked with another PDCCH candidate in a monitoring occasion of a second search space set on a second scheduling component carrier. DCI formats 0_1/0_2 (e.g., for scheduling PUSCH or UL Type2 CG release) or DCI formats 1_1/1_2 (e.g., for scheduling PDSCH or semi-persistent scheduling (SPS) release) may be detected in the linked PDCCH candidates across the two scheduling component carriers. As described in some examples herein, a scheduled component carrier is the same as one of the two scheduling component carriers. For example, the two scheduling component carriers may be a PCell and an sSCell (scheduling SCell), and the scheduled cell is PCell. In other examples, the scheduled component carrier is a third component carrier that is different than the scheduling component carriers.

For example, the UE 115-a may receive, from the base station 105-a, a scheduling configuration 410 for scheduling communications 425 on a first component carrier 415 (e.g., scheduled component carrier 415). The scheduling configuration 410 may be transmitted via control signaling, including an RRC message, a synchronization signal block (SSB) message, a DCI message, or any combination thereof. In some aspects, the scheduling configuration 410 may indicate multiple downlink control channel candidates (e.g., PDCCH candidates 420) which are linked for control channel repetition, and which may be used to schedule communications 425 on the first component carrier 415.

For example, a first scheduling configuration 410-a may indicate multiple PDCCH candidates 420 which are linked for control channel repetition, and which may be used to schedule communications 425 (e.g., communication 425-a) on a first component carrier 415-a (CC0). The first scheduling configuration 410-a may include a first PDCCH candidate 420-a on a second component carrier 415-b (CC1) (e.g., scheduling component carrier 415-b) that is linked for control channel repetition to a second PDCCH candidate 420-b on the first component carrier 415-a (CC0). In this example, the first component carrier 415-a (CC0) includes both the scheduled component carrier 415 and a scheduling component carrier 415. In other words, in the first scheduling configuration 410-a, the scheduled component carrier 415-a (CC0) includes the PCell, and the two scheduling component carriers 415-a, 415-b (CC0, CC1) include the PCell and an sSCell, respectively.

By way of another example, a second scheduling configuration 410-*b* may indicate multiple PDCCH candidates 420 which are linked for control channel repetition, and which may be used to schedule communications 425 (e.g., communication 425-*b*) on a scheduled component carrier 415-*e* (CC4). The second scheduling configuration 410-*b* may include a first PDCCH candidate 420-*c* on a second component carrier 415-*d* (CC3) (e.g., scheduling component carrier 415-*d*) that is linked for control channel repetition to a second PDCCH candidate 420-*d* on a third component carrier 415-*c* (CC2) (e.g., scheduling component carrier 415-*c*). In this example, the component carriers 415-*c*, 415-*d* (CC2, CC3) include scheduling component carriers 415, and the component carrier 415-*e* (CC4) includes the scheduled component carrier 415.

The scheduling configuration 410 may indicate various parameters associated with scheduling communications 425 on the respective scheduled component carrier 415 (e.g., scheduled component carrier 415-*a*, 415-*e*), including search space sets for the respective PDCCH candidates 420, periodicities of the respective search space sets, SCSs of the search space sets, and the like.

For example, the first scheduling configuration 410-*a* may include an indication of a first search space set associated with the first PDCCH candidate 420-*a* and a second search space set associated with the second PDCCH candidate 420-*b*. The first and second PDCCH candidates 420-*a*, 420-*b* may be associated with (e.g., positioned within) monitoring occasions of the first and second search space sets, respectively. In this example, the first scheduling configuration 410-*a* may indicate that the first and second search space sets are linked for control channel repetition (e.g., PDCCH repetition) for scheduling communications 425 on the scheduled component carrier 415-*a* (CC0). By way of another example, the second scheduling configuration 410-*b* may include an indication of a first search space set associated with the first PDCCH candidate 420-*c* and a second search space set associated with the second PDCCH candidate 420-*d*. In this example, the second scheduling configuration 410-*b* may indicate that the first and second search space sets are linked for control channel repetition (e.g., PDCCH repetition) for scheduling communications 425 on the scheduled component carrier 415-*e* (CC4).

In cases where the scheduling configuration 410 indicates search space sets associated with the respective PDCCH candidates 420, the scheduling configuration 410 may further indicate one or more parameters associated with the indicated search space sets, including search space set indexes, periodicities, a number of PDCCH candidates 420 for each search space set, and the like.

In some aspects, the first and second search space sets associated with the respective PDCCH candidates 420 may be associated with the same (e.g., common) search space set index. Moreover, in some cases, a third search space set associated with the scheduled component carrier 415 may also be associated with the same (e.g., common) search space set index. For example, the second scheduling configuration 410-*b* may indicate that the first search space set and the second search space set corresponding to the first and second PDCCH candidates 420-*c*, 420-*d*, respectively, are associated with the same search space set index, and are therefore linked for control channel repetition. In some cases, the second scheduling configuration 410-*b* may further indicate that a third search space set associated with the scheduled component carrier 415-*e* (CC4) is associated with the same search space set index as the first and second search space set indices. In this regard, the UE 115-*a* may be configured to determine that the first and second search space sets are linked for control channel repetition based on the respective search space sets being associated with the same search space set index. Moreover, the UE 115-*a* may be configured to determine that the first and second search space sets are linked for control channel repetition used to schedule communications 425 (e.g., communication 425-*b*) on the scheduled component carrier 415-*e* based on the first, second, and third search space sets all being associated with the same search space set index.

In some implementations, the first and second search space sets associated with the first and second PDCCH candidates 420, respectively, may include an equal number of monitoring occasions and/or equal quantities of PDCCH candidates 420. In other words, the first search space set and the second search space set may exhibit a one-to-one mapping (e.g., one-to-one linking) between PDCCH candidates 420. In particular, the first and second search space sets may include an equal number of PDCCH candidates 420 corresponding to the scheduled component carrier 415-*a*, 415-*e* (e.g., scheduled component carriers 415) for each aggregation level. For example, referring to the first scheduling configuration 410-*a*, the first search space set may include a first quantity of PDCCH candidates 420 including the first PDCCH candidate 420-*a*. Similarly, the second search space set may include a second quantity of PDCCH candidates 420 including the second PDCCH candidate 420-*b*. In this example, the first quantity of downlink control channel candidates and the second quantity of downlink control channel candidates may be the same. In this regard, the first and second search space sets may include an equal number of PDCCH candidates 420 (e.g., equal number of PDCCH candidates 420 on the component carriers 415-*a*, 415-*b*). Similarly, referring to the second scheduling configuration 410-*b*, search space sets on the component carriers 415-*c*, 415-*d* may exhibit an equal number of PDCCH candidates 420, including the first and second PDCCH candidates 420-*c*, 420-*d*.

In some implementations, the scheduling configuration 410 may indicate SCSs associated with the respective component carriers 415 (e.g., scheduled component carrier 415, scheduling component carriers 415). For example, the second scheduling configuration 410-*b* may include an indication of a first SCS associated with the scheduled component carrier 415-*e*, and a second SCS associated with the scheduling component carrier 415-*c*, and a third SCS associated with the scheduling component carrier 415-*d*.

In some aspects, an SCS of the respective scheduling component carriers 415 may be the same. For example, referring to the first scheduling configuration 410-*a*, the SCSs of the component carrier 415-*a* (CC0) and the component carrier 415-*b* (CC1) may be the same. By way of another example, referring to the second scheduling configuration 410-*b*, the SCSs of the scheduling component carrier 415-*c* (CC2) and scheduling component carrier 415-*d* (CC3) may be the same (e.g., equal).

In cases where the SCSs of the scheduling component carriers 415 (e.g., scheduling component carriers 415-*a* and 415-*b* in the first scheduling configuration 410-*a*, scheduling component carriers 415-*c* and 415-*d* in the second scheduling configuration 410-*b*) are equal, other parameters associated with the respective search space sets may also be equal in order to maintain a one-to-one mapping/linking between PDCCH candidates 420 of the respective search space sets.

Other parameters associated with the search space sets may include a periodicity, a number/quantity of PDCCH candidates 420, a number/quantity of monitoring occasions, or any combination thereof. In cases where the SCS of the scheduling component carriers 415 is the same, the periodicity of the search space sets of the respective scheduling component carriers 415 may also be the same, and the number of monitoring occasions within a slot may be the same for the search space sets on the respective scheduling component carriers 415. Comparatively, in cases where the SCS of the scheduling component carriers 415 is different, the ratio of the periodicity of the search space sets of the respective scheduling component carriers 415 (in terms of a number of slots) may be the same as the ratio of the SCSs of the respective scheduling component carriers 415.

For example, in cases where the SCSs of the scheduling component carriers 415 is the same, the scheduling configuration 410 may further indicate a periodicity associated with both the first and second search space sets, a number of monitoring occasions per slot associated with both the first and second search space sets, or both. In this regard, the scheduling configuration 410 may indicate that the scheduling component carriers 415 exhibit the same SCS, and further indicate that the search space sets associated with the respective scheduling component carriers 415 occur with the same periodicity, the same number of monitoring occasions per slot, or both.

In additional or alternative implementations, SCSs of the respective scheduling component carriers 415 may be different. For example, referring to the first scheduling configuration 410-a, the SCSs of the scheduling component carriers 415-a and 415-b may be different. By way of another example, referring to the second scheduling configuration 410-b, the scheduling component carriers 415-c and 415-d may exhibit different SCSs.

In cases where the SCSs of the scheduling component carriers 415 are different, other parameters (e.g., periodicity, number of PDCCH candidates 420, number of monitoring occasions) associated with the respective search space sets may also be selectively configured in order to maintain a one-to-one mapping/linking between PDCCH candidates 420 of the respective search space sets. In particular, in cases where the SCSs of the scheduling component carriers 415 are different, the ratio of the periodicity of the respective search space sets (in terms of numbers of slots) should be the same as the ratio of the respective SCSs.

For example, referring to the second scheduling configuration 410-b, the scheduling component carriers 415-d and 415-c may be associated with first and second search space sets, respectively. In this example, the scheduling component carrier 415-d (CC3) may be associated with a first SCS, and the scheduling component carrier 415-c (CC2) may be associated with a second SCS different from the first SCS. Further, the first search space set of the scheduling component carrier 415-d (CC3) may be associated with a first periodicity, and the second search space set of scheduling component carrier 415-c (CC2) may be associated with a second periodicity different from the first periodicity. In this example, a first ratio between the first SCS and the second SCS may be the same as a second ratio between the first periodicity and the second periodicity. Configuring the SCSs of the scheduling component carriers 415 and the periodicities of the search space sets of the scheduling component carriers 415 such that the ratio of the SCSs is equal to the ratio of the periodicities may ensure a one-to-one mapping (e.g., one-to-one linking) between PDCCH candidates 420 of the first and second search space sets.

In some aspects, the scheduled component carriers 415 (e.g., scheduled component carriers 415-a, 415-e) may not be configured with a CORESET, but may be configured with search space sets. For search space sets configured in the scheduled component carriers 415, fields associated with search space set indexes (e.g., searchSpaceId), a number of control channel candidates per aggregation level (e.g., nrofCandidates) may be configured. Comparatively, other fields for search space sets configured in the scheduled component carriers 415 may be absent, or not configured, including fields associated with CORESETs, fields associated with time domain properties (e.g., periodicity, offset, duration, monitoring symbols per slot), fields associated with DCI formats to monitor, and the like. In particular, these fields (except for fields relating to a number of control channel candidates for each aggregation level) may be defined for a search space set of the scheduling component carriers 415 which schedule the respective scheduled component carriers 415.

In some aspects, the UE 115-a, the base station 105-a, or both, may identify one of the downlink control channel candidates (e.g., PDCCH candidates 420) of the scheduling component carriers 415 as a reference downlink control channel candidate (e.g., reference PDCCH candidate 420). In this regard, the UE 115-a and/or the base station 105-a may identify one of the PDCCH candidates 420 which are linked for control channel repetition as a reference PDCCH candidate 420. For example, in cases where the UE 115-a is configured with the first scheduling configuration 410-a, the UE 115-a and/or the base station 105-a may identify one of the first or second PDCCH candidates 420-a, 420-b as a reference PDCCH candidate 420. In other cases where the UE 115-a is configured with the second scheduling configuration 410-b, the UE 115-a and/or the base station 105-a may identify one of the first or second PDCCH candidates 420-c, 420-d as a reference PDCCH candidate 420. As such, the UE 115-a and/or the base station 105-a may identify one of the PDCCH candidates 420 as a reference PDCCH candidate 420 based on the scheduling configuration 410.

In some aspects, the scheduling configuration 410 may explicitly indicate which PDCCH candidate 420 is the reference PDCCH candidate 420. In other words, in some cases, the scheduling configuration 410 may include an indication of the reference PDCCH candidate 420. In other cases, the UE 115-a and/or the base station 105-a may be configured to identify one of the PDCCH candidates 420 as a reference PDCCH candidate 420 based on one or more parameters associated with the scheduling component carriers 415, parameters associated with the respective search space sets, parameters associated with the PDCCH candidates 420, or any combination thereof. Parameters used to identify the reference PDCCH candidate 420 may include, but are not limited to, component carrier indexes, SCSs associated with respective component carriers 415, relative positioning of the PDCCH candidates 420 in the time domain, or any combination thereof.

For example, referring to the second scheduling configuration 410-b, the first PDCCH candidate 420-c may be associated with a first search space set, and the second PDCCH candidate 420-d may be associated with a second search space set. In this example, the UE 115-a and/or the base station 105-a may identify one of the first or second PDCCH candidates 420-a, 420-b as the reference PDCCH candidate 420 based on one or more parameters associated with the scheduling component carrier 415-c (CC2), the scheduling component carrier 415-d (CC3), the scheduled component carrier 415-e (CC4), or any combination thereof. In this regard, the reference PDCCH candidate 420 may be determined based on parameters associated with the scheduling component carriers 415-*c*, 415-*d* and/or the scheduled component carrier 415-*e*. The one or more parameters may include, but are not limited to, a component carrier index, an SCS, or both.

For example, the UE 115-*a* and/or the base station 105-*a* may be configured to identify a PDCCH candidate 420 within the scheduling component carrier 415 with the higher or lower component carrier index as the reference downlink control channel candidate. For instance, if the scheduling component carrier 415-*d* (CC2) of the second scheduling configuration 410-*b* is associated with a higher component carrier index as compared to the scheduling component carrier 415-*c*, the UE 115-*a* may be configured to identify the second PDCCH candidate 420-*d* as the reference PDCCH candidate 420.

In other cases, the UE 115-*a* and/or the base station 105-*a* may be configured to identify a PDCCH candidate 420 within the scheduling component carrier 415 with the higher or lower SCS as the reference PDCCH candidate 420. For example, if the scheduling component carrier 415-*b* (CC1) of the first scheduling configuration 410-*a* is associated with a higher SCS as compared to the component carrier 415-*a* (CC0), the UE 115-*a* may be configured to identify the first PDCCH candidate 420-*a* as the reference PDCCH candidate 420.

In cases where a PDCCH candidate 420 is positioned within the scheduled component carrier 415, the UE 115-*a* and/or the base station 105-*a* may be configured to identify the PDCCH candidate 420 within the scheduled component carrier 415 as the reference PDCCH candidate 420. For example, in the first scheduling configuration 410-*a*, the UE 115-*a* may be configured to identify the second PDCCH candidate 420-*b* as the reference PDCCH candidate 420 based on the second PDCCH candidate 420-*b* being positioned within the scheduled component carrier 415-*a* (CC0). In such cases, the PDCCH candidate 420 on the PCell (e.g., second PDCCH candidate 420-*b* on the scheduled component carrier 415-*a*) may be considered the reference PDCCH candidate 420.

In other cases, the UE 115-*a* and/or the base station 105-*a* may identify the reference PDCCH candidate 420 as the reference PDCCH candidate 420 based on a relative position of the respective PDCCH candidates 420 in the time domain. For example, the UE 115-*a* and/or the base station 105-*a* may be configured to identify one of the PDCCH candidates 420 as the reference PDCCH candidate 420 based on which of the PDCCH candidates 420 ends later in a time domain, which of the PDCCH candidates 420 begins earlier in the time domain, or both. For instance, in some cases, the PDCCH candidate 420 which ends later in the time domain (e.g., PDCCH candidates 420-*b*, 420-*d*) may be considered the reference PDCCH candidate 420. In other cases, the PDCCH candidate 420 which starts earlier in the time domain (e.g., PDCCH candidates 420-*a*, 420-*c*) may be considered the reference PDCCH candidate 420.

As will be discussed in further detail herein, the position of the reference PDCCH candidate 420 may be used to identify other parameters for communications 425 between the UE 115-*a* and the base station 105-*a*, including resources for feedback information (e.g., HARQ-ACK resources), payload sizes of feedback messages 435, offsets for scheduled communications 425, beams for scheduled communications 425, preparation times for scheduled communications 425, CSI computation times for scheduled communications 425, and the like.

In some aspects, the UE 115-*a* may monitor the search space sets configured via the scheduling configuration 410. The UE 115-*a* may monitor the respective search space sets for one or more repetitions of a control message 430 which schedule communications 425 on the scheduled component carrier 415 (e.g., scheduled component carriers 415-*a*, 415-*e*). In particular, the UE 115-*a* may monitor the search space sets which are configured for control channel repetition for scheduling communications 425 on the scheduled component carrier 415. For example, in cases where the UE 115-*a* is configured with the first scheduling configuration 410-*a*, the UE 115-*a* may monitor the first search space set associated with the first PDCCH candidate 420-*a* and the second search space set associated with the second PDCCH candidate 420-*b*. In this regard, the UE 115-*a* may be configured to monitor the search space sets based on receiving the scheduling configuration 410, identifying the reference PDCCH candidate 420, or both.

The UE 115-*a* may be configured to monitor the search space sets based on (e.g., in accordance with) one or more parameters associated with the respective search space sets, parameters associated with the respective component carriers 415, or both. Parameters which may be used by the UE 115-*a* when monitoring the search space sets may include SCSs of the respective component carriers 415, periodicities associated with the respective search space sets, search space set indexes associated with the respective search space sets, or any combination thereof.

For example, referring to the first scheduling configuration 410-*a*, the first and second PDCCH candidates 420-*a*, 420-*b* which are linked for control channel repetition may be associated with a first and second search space set, respectively. The first search space set and the second search space may be associated with a first periodicity, and the second search space set may be associated with a second periodicity. The first and second periodicities may be the same or different, as described previously herein. In this example, the UE 115-*a* may monitor the first and second search space sets in accordance with the first periodicity and the second periodicity. Further, the UE 115-*a* may monitor the first and second search space sets based on (e.g., in accordance with) SCSs associated with the component carriers 415-*b*, 415-*a* corresponding to the respective search space sets.

In some implementations, the UE 115-*a* may monitor the search space sets for control messages 430 which schedule communications 425 on the scheduled component carrier 415 based on search space sets associated with the scheduled component carrier 415 and the scheduling component carriers 415 being associated with the same search space set index. In other words, the UE 115-*a* may monitor the linked search space sets based on linked search space sets of the scheduling component carriers 415 being associated with the same search space set index as a search space set of the scheduled component carrier 415.

For example, referring to the second scheduling configuration 410-*b*, the scheduling component carriers 415-*c*, 415-*d* may be associated with first and second search space sets, respectively, which are linked for control channel repetition for scheduling communications 425 on the scheduled component carrier 415-*e*. Moreover, the scheduled component carrier 415-*e* may be associated with a third search space set. In this example, the first, second, and third search space sets may be associated with a common (e.g., same) search space set index. As such, the UE 115-*a* may be configured to monitor the first and second search space set indexes based on the first, second, and third search space indexes across the scheduling and scheduled component carriers 415 all being associated with a common search space set index.

In some aspects, the UE 115-*a* may receive, from the base station 105-*a*, a first repetition of a control message 430-*a*. In some aspects, the control message 430-*a* may schedule a communication 425 (e.g., communication 425-*a*, 425-*b*) between the UE 115-*a* and the base station 105-*a* over the scheduled component carrier 415 (e.g., scheduled component carrier 415-*a*, 415-*e*). The communication 425 scheduled by the control message 430-*a* may include a PDSCH transmission, a PUSCH transmission, or both. As such, the control message 430-*a* may indicate an SPS release and/or a configured grant release (e.g., uplink Type 2 configured grant) on the scheduled component carrier 415. The control message 430-*a* may include a DCI message (e.g., DCI formats 0_1, 0_2, 1_1, and/or 1_2).

In some aspects, the UE 115-*a* may receive the first repetition of the control message 430-*a* within the first PDCCH candidate 420 which is linked for control channel repletion that was configured by the scheduling configuration 410. For example, referring to the first scheduling configuration 410-*a*, the UE 115-*a* may receive the first repetition of the control message 430-*a* within the first PDCCH candidate 420-*a*. By way of another example, referring to the second scheduling configuration 410-*b*, the UE 115-*a* may receive the first repetition of the control message 430-*a* within the first PDCCH candidate 420-*c*. In this regard, the UE 115-*a* may receive the first repetition of the control message 430-*a* based on (e.g., in accordance with) the received scheduling configuration 410. Additionally or alternatively, the UE 115-*a* may receive the first repetition of the control message 430-*a* based on identifying the reference PDCCH candidate 420, monitoring the search space sets, or any combination thereof.

In some cases, the UE 115-*a* may receive, from the base station 105-*a*, a second repetition of the control message 430-*b*. The second repetition of the control message 430-*b* may schedule a communication 425 (e.g., PDSCH/SPS release, PDSCH/configured grant release) between the UE 115-*a* and the base station 105-*a* over the first component carrier 415 (e.g., scheduled component carrier 415). In particular, the second repetition of the control message 430-*b* may include a same data payload, and may schedule the same communication 425, as the first repetition of the control message 430-*a*. The control message 430-*b* may include a DCI message (e.g., DCI formats 0_1, 0_2, 1_1, and/or 1_2).

In this regard, PDCCH repetition across different search space sets (e.g., when different scheduling component carriers 415 are configured to schedule a single component carrier 415) may be used to schedule PUSCH and/or PDSCH communications over the scheduled component carrier 415, indicate SPS release and/or a configured grant release (e.g., uplink Type 2 configured grant) over the scheduled component carrier 415, or any combination thereof. Moreover, PDCCH repetition across different component carriers 415 may improve PDCCH diversity (e.g., frequency diversity), thereby improving a reliability of wireless communications.

In some aspects, the UE 115-*a* may receive the second repetition of the control message 430-*b* within the second PDCCH candidate 420 which is linked for control channel repletion that was configured by the scheduling configuration 410. For example, referring to the first scheduling configuration 410-*a*, the UE 115-*a* may receive the second repetition of the control message 430-*b* within the second PDCCH candidate 420-*b*. By way of another example, referring to the second scheduling configuration 410-*b*, the UE 115-*a* may receive the second repetition of the control message 430-*b* within the second PDCCH candidate 420-*d*.

In this regard, the UE 115-*a* may receive the second repetition of the control message 430-*b* based on (e.g., in accordance with) the received scheduling configuration 410. Additionally or alternatively, the UE 115-*a* may receive the second repetition of the control message 430-*b* based on identifying the reference PDCCH candidate 420, monitoring the search space sets, receiving the first repetition of the control message 430-*a*, or any combination thereof.

In some cases, the UE 115-*a* may receive both the first and second repetitions of the control message 430-*a*, 430-*b*. In other cases, the UE 115-*a* may receive only one of the first or second repetition of the control message 430-*a*, 430-*b*. For example, referring to the second scheduling configuration 410-*b*, interference may affect a performance of communications performed over the scheduling component carrier 415-*d* (CC3) associated with the first PDCCH candidate 420-*c*, but may not affect performance of communications performed over the scheduling component carrier 415-*c* (CC2) associated with the second PDCCH candidate 420-*d*. As such, in this example, the UE 115-*a* may not successfully receive the first repetition of the control message 430-*c*, but may successfully receive the second repetition of the control message 430-*d*.

The use of PDCCH repetition to schedule communications 425 over the scheduled component carrier 415 may improve transmission diversity (e.g., frequency diversity), which may improve a likelihood that the UE 115-*a* will receive at least one repetition of the control message 430. Moreover, transmitting/receiving multiple repetitions of control messages 430 across multiple scheduling component carriers 415 may improve a beam diversity for transmitting/receiving the respective control message 430 repetitions, as CORESETs and TCI states may be configured separately for the respective scheduling component carriers 415. As such, techniques described herein may improve beam and spatial diversity of control messages 430 (e.g., PDCCH messages, DCI messages) used to schedule communications 425 over the scheduled component carrier 415 without requiring UE 115-*a* to be capable of supporting multiple beams within a single component carrier 415.

In cases where the UE 115-*a* receives only the first or second repetition of the control message 430, the UE 115-*a* may demodulate/decode the single received repetition of the control message 430. In other cases where the UE 115-*a* receives both the first and second repetitions of the control message 430-*a*, 430-*b*, the UE 115-*a* may demodulate/decode only one of the first or second repetitions of the control message 430-*a*, 430-*b*. Additionally or alternatively, the UE 115-*a* may combine the first and second repetitions of the control message 430-*a*, 430-*b*.

For example, the UE 115-*a* may perform soft-combining (e.g., perform one or more soft-combining procedures) of the first and second repetitions of the control message 430-*a* in order to demodulate/decode the repetitions of the control message 430-*a*, 430-*b*. In particular, the UE 115-*a* may perform soft-combining of a first signal (e.g., first repetition of the control message 430-*a*) corresponding to the first PDCCH candidate 420 with a second signal (e.g., second repetition of the control message 430-*b*) corresponding to the second PDCCH candidate 420.

In some aspects, the UE 115-*a* may transmit a feedback message 435 to the base station 105-*a*. The UE 115-*a* may transmit the feedback message 435 based on (e.g., in response to) receiving the at least one repetition of the control message 430-*a*, 430-*b*. The feedback message 435 may include a HARQ message (e.g., ACK, NACK). In some aspects, the UE 115-*a* may transmit the feedback message 435 based on receiving the scheduling configuration 410, identifying the reference PDCCH candidate 420, monitoring the search space sets, receiving the first and/or second repetitions of the control message 430-*a*, 430-*b*, performing the soft-combining, or any combination thereof.

In some aspects, the UE 115-*a* may determine one or more parameters/characteristics associated with the feedback message 435 based on the identified reference PDCCH candidate 420. Parameters/characteristics of the feedback message 435 which may be determined based on the reference PDCCH candidate 420 may include, but are not limited to, resources for transmitting the feedback message 435, a payload size of the feedback message 435, or any combination thereof.

For example, the UE 115-*a* may determine a resource (e.g., set of resources) for transmitting the feedback message 435 based on the identified reference PDCCH candidate 420. In particular, the UE 115-*a* may determine the resource for transmitting the feedback message 435 based on a starting CCE of the reference PDCCH candidate 420. In other cases, the UE 115-*a* may interpret a downlink assignment index (DAI) within the received first and/or second repetitions of the control message 430-*a*, 430-*b* based on the reference PDCCH candidate 420. By way of another example, the UE 115-*a* may determine a payload size for the feedback message 435 based on DAI which is based on the reference PDCCH candidate 420. In particular, the UE 115-*a* may interpret DAI within received control messages 430 (e.g., received DCI messages) based on a monitoring occasion of the received control message(s) 430-*a*, 430-*b*.

The UE 115-*a* may perform (e.g., transmit, receive) the communication 425 (e.g., communication 425-*a*, 425-*b*) which was scheduled by the one or more repetitions of the control message 430-*a*, 430-*b* over the scheduled component carrier 415 (e.g., scheduled component carrier 415-*a*, 415-*e*). For example, in cases where the scheduled communication 425 includes a PUSCH transmission, the UE 115-*a* may transmit the scheduled PUSCH transmission to the base station 105-*a* over the scheduled component carrier 415. By way of another example, example, in cases where the scheduled communication 425 includes a PDSCH transmission, the UE 115-*a* may receive the scheduled PDSCH transmission from the base station 105-*a* over the scheduled component carrier 415.

The UE 115-*a* and the base station 105-*a* may perform the scheduled communication 425 based on transmitting/receiving the scheduling configuration 410, identifying the reference PDCCH candidate 420, monitoring the search space sets, transmitting/receiving the repetition(s) of the control message 430-*a*, 430-*b*, performing the soft-combining, transmitting/receiving the feedback message 435, or any combination thereof.

In some aspects, the UE 115-*a* may determine one or more parameters/characteristics associated with the scheduled communication 425 based on the identified reference PDCCH candidate 420. Parameters/characteristics of the scheduled communication 425 which may be determined based on the reference PDCCH candidate 420 may include, but are not limited to, an offset (e.g., slot offset) for the scheduled communication 425, a beam for the scheduled communication 425, a preparation time for the scheduled communication 425, a CSI computation time for the scheduled communication 425, or any combination thereof.

For example, the UE 115-*a* may transmit or receive the scheduled communication 425 within a slot that is offset relative to the identified reference PDCCH candidate 420. In this regard, the UE 115-*a* may determine a slot offset based on the reference PDCCH candidate 420, where the slot offset of measured relative to a reference slot including the reference PDCCH candidate 420. In particular, the UE 115-*a* may identify a reference slot and/or reference PDCCH candidate 420 to apply a slot offset indicated in the control message 430 (e.g., DCI message) to identify the slot of the scheduled communication 425. For example, the UE 115-*a* may determine a slot of the reference PDCCH candidate 420 and apply a slot offset indicated in the control message 430 to identify a slot of a scheduled PDSCH transmission, a scheduled PUSCH transmission, a scheduled CSI-RS transmission, a scheduled sounding reference signal (SRS) transmission, or any combination thereof. By way of another example, the UE 115-*a* may determine a beam for transmitting/receiving the scheduled transmission based on the reference PDCCH candidate 420, and may perform the scheduled communication 425 using the determined beam. In particular, the UE 115-*a* may determine a scheduling offset based on the reference PDCCH candidate 420, and may be configured to determine whether the UE 115-*a* is to use a default beam or a different indicated beam based on the scheduling offset. For instance, if the determined scheduling offset is less than to a threshold (e.g., timeDurationforQCL), the UE 115-*a* may determine that a default beam is to be used, otherwise the UE 115-*a* may determine that an indicated beam is to be used.

By way of another example, the UE 115-*a* may determine a preparation time and/or a CSI computation time associated with the scheduled communication 425 (e.g., timeline for PUSCH preparation or CSI computation) based on the reference PDCCH candidate 420. In this example, the UE 115-*a* may then perform the scheduled communication 425 based on (e.g., in accordance with), the determined preparation time and/or determined CSI computation time. In particular, the timeline for PUSCH preparation or CSI computation (e.g., preparation time, CSI computation time) may be specified (e.g., specified for N2 and Z OFDM symbols), and may begin after a last symbol of the reference PDCCH candidate 420 and/or after a last symbol of a received control message 430.

Techniques described herein may provide for improved cross-carrier scheduling. In particular, techniques described herein may enable the use of PDCCH repetition in the context of cross-carrier scheduling, which may enable multiple PDCCH repetitions across multiple scheduling component carriers 415 to schedule communications 425 within a scheduled component carrier 415. By enabling PDCCH repetition in the context of cross-carrier scheduling, techniques described herein may improve transmission diversity (e.g., frequency diversity, beam diversity) of control messages 430 used for cross-carrier scheduling. As such, by improving transmission diversity and enabling multiple repetitions of control signaling to schedule communications 425 on a scheduled component carrier 415, techniques described herein may improve reliability of control signaling used for cross-carrier scheduling, which may enable more efficient and widespread use of cross-carrier scheduling.

Figure 5:
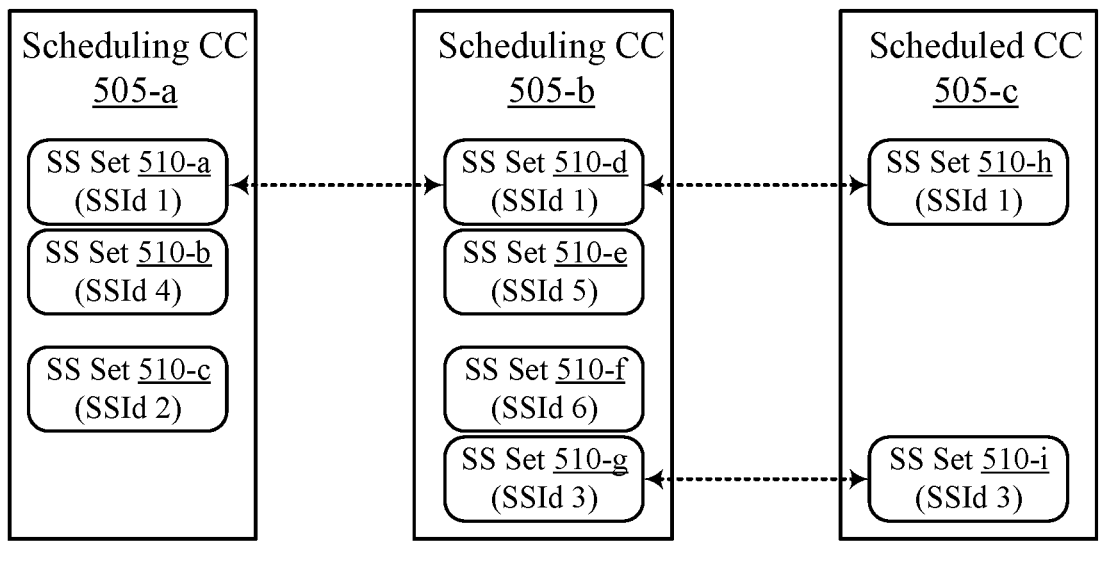
FIG. 5 illustrates an example of a resource configuration that supports techniques for control channel repetition across component carriers in accordance with aspects of the present disclosure.

FIG. 5 illustrates an example of a resource configuration 500 that supports techniques for control channel repetition across component carriers in accordance with aspects of the present disclosure.

The resource configuration 500 may include a first scheduling component carrier 505-*a* (e.g., first scheduling cell), a second scheduling component carrier 505-*b* (e.g., second scheduling cell), and a scheduled component carrier 505-*c*

(e.g., scheduled cell). The first scheduling component carrier 505-*a* may include search space sets 510-*a*, 510-*b*, and 510-*c*. The second scheduling component carrier 505-*b* may include search space sets 510-*d*, 510-*e*, 510-*f*, and 510-*g*. Moreover, the scheduled component carrier 505-*c* may include search space sets 510-*h* and 510-*i*.

As noted previously herein, the scheduled component carrier 505-*c* may not be configured with a CORESET, but may be configured with the search space sets 510-*h*, 510-*i*. For the search space sets 510-*h*, 510-*i* configured in the scheduled component carrier 505-*c*, fields associated with search space set indexes (e.g., searchSpaceId) and a number of control channel candidates per aggregation level (e.g., nrofCandidates) may be configured. Comparatively, other fields for the search space sets 510-*h*, 510-*i* configured in the scheduled component carrier 505-*c* may be absent, or not configured, including fields associated with CORESETs, fields associated with time domain properties (e.g., periodicity, offset, duration, monitoring symbols per slot), fields associated with DCI formats to monitor, and the like. In particular, these fields (except for fields relating to a number of control channel candidates for each aggregation level) may be defined for the search space sets 510 of the scheduled component carriers 505-*a*, 505-*b* which schedule the respective scheduled component carrier 505-*c*.

As shown in resource configuration 500, the search space set 510-*h* associated with the scheduled component carrier 505-*c* may be configured with cross-carrier control channel repetition. That is, the search space set 510-*h* associated with the scheduled component carrier 505-*c* may be scheduled via control channel repetition via the search space set 510-*a* associated with the first scheduling component carrier 505-*a* and the search space set 510-*d* associated with the second scheduling component carrier 505-*b*. In this regard, the search space sets 510-*a*, 510-*d* may be linked for control channel repetition for scheduling communications over the scheduled component carrier 505-*c* (e.g., on the search space set 510-*h* on the scheduled component carrier 505-*c*). Adoringly, a UE 115 may be configured to receive multiple repetitions of the same control message within the search space set 510-*a* of the first scheduling component carrier 505-*a* and the search space set 510-*d* of the second scheduling component carrier 505-*b*, where both repetitions of the control message schedule a communication within the search space set 510-*h* of the scheduled component carrier 505-*c*.

In some aspects, the search space sets 510-*a*, 510-*d* may be linked for control channel repetition based on being associated with a common search space set index (e.g., searchSpaceId 1). Moreover, the search space set 510-*h* of the scheduled component carrier 505-*c* may be configured with cross-carrier control channel repetition over the search space sets 510-*a*, 510-*d* based on the search space set 510-*h* being associated with the same search space set index as the search space sets 510-*a*, 510-*d* (e.g., searchSpaceId 1).

Comparatively, the search space set 510-*i* of the scheduled component carrier 505-*c* may be configured for cross-carrier scheduling via signaling over the second scheduling component carrier 505-*b*, but may not be scheduled via control channel repetition. That is, the search space set 510-*g* of the second scheduling component carrier 505-*b* may have a same index as search space set 510-*i*, but since search space set 510-*i* is not linked to an additional search space set 510 having the same index on the first scheduling component carrier 505-*a* (or any other component carrier 505), control channel repetition is not configured. The configuration of control channel repetition for scheduling communications on the scheduled component carrier 505-*c* may be configured as part of search space set configurations of the scheduling component carriers 505-*a*, 505-*b*, as part of search space set configurations of the scheduled component carrier 505-*c*, based on search space sets with the same index as explained above, or any combination thereof.

Figure 6:
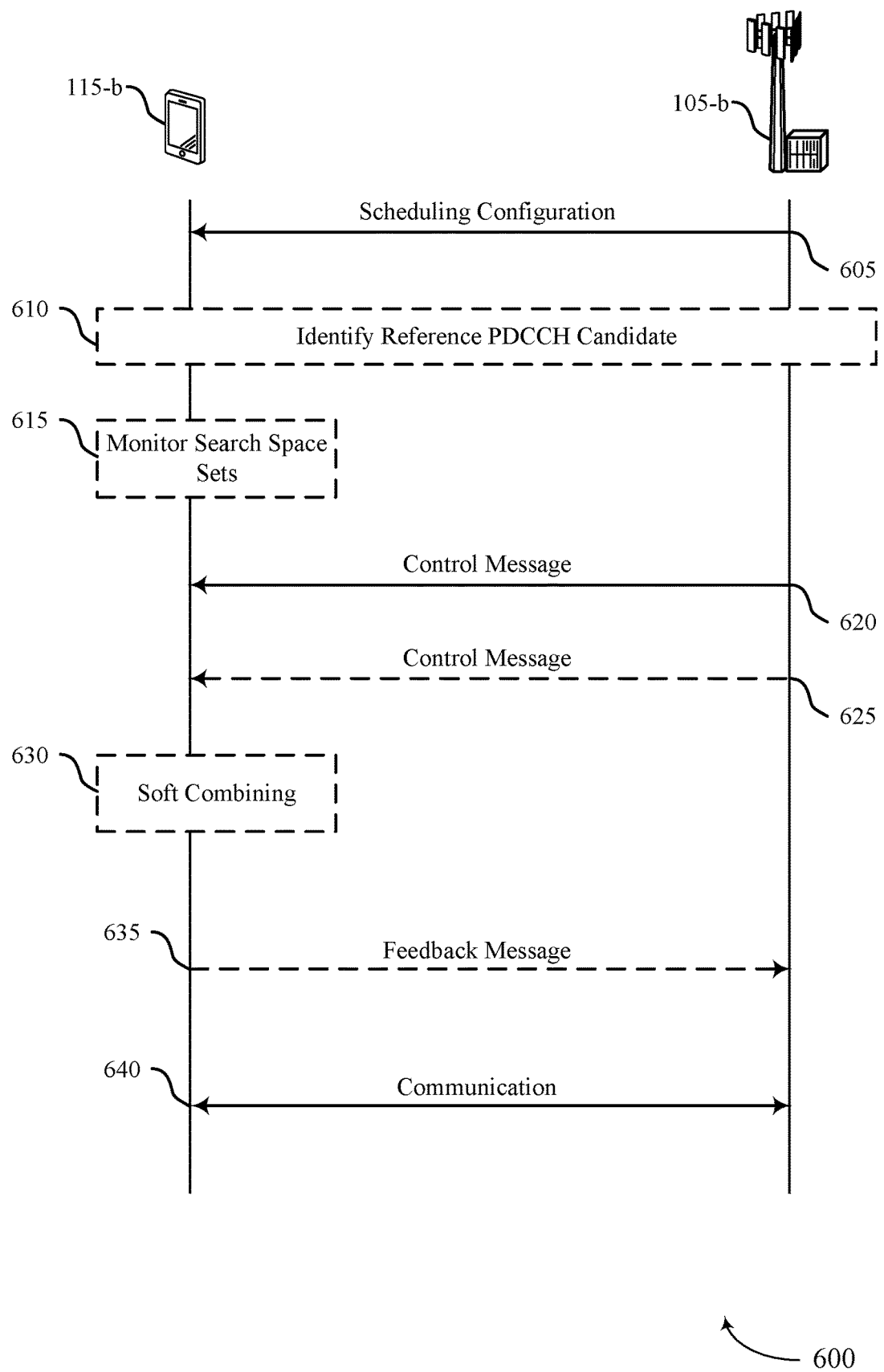
FIG. 6 illustrates an example of a process flow that supports techniques for control channel repetition across component carriers in accordance with aspects of the present disclosure.

FIG. 6 illustrates an example of a process flow 600 that supports techniques for control channel repetition across component carriers in accordance with aspects of the present disclosure. In some examples, process flow 600 may implement, or be implemented by, aspects of wireless communications systems 100, resource configuration 200, resource configuration 300, wireless communications system 400, resource configuration 500, or any combination thereof. For example, the process flow 600 may illustrate a UE 115-*b* receiving a scheduling configuration for cross-carrier scheduling of a first component carrier, receiving at least one repetition of a control message in accordance with the scheduling configuration, and performing a communication scheduled by the at least one repetition of the control message over the first component carrier, as described with reference to FIGS. 1-5.

In some cases, process flow 600 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 4.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 605, the UE 115-*b* may receive, from the base station 105-*b*, a scheduling configuration for scheduling communications on a first component carrier (e.g., scheduled component carrier). The scheduling configuration may be transmitted via control signaling, including an RRC message, an SSB message, a DCI message, MAC-CE message, or any combination thereof.

In some aspects, the scheduling configuration may indicate multiple downlink control channel candidates (e.g., PDCCH candidates) which are linked for control channel repetition, and which may be used to schedule communications on the first component carrier. At least one of the control channel candidates may be within a second component carrier (e.g., scheduling component carrier) which is different from the first component carrier. In this regard, the scheduling configuration may indicate a configuration of control channel candidates within two or more scheduling component carriers which may be used for scheduling communications within a scheduled component carrier.

For example, the scheduling configuration may indicate a first downlink control channel candidate on a second component carrier (e.g., scheduling component carrier) that is linked for control channel repetition to a second downlink control channel candidate on the first component carrier. In this example, the first component carrier includes both the scheduled component carrier and a scheduling component carrier. By way of another example, the scheduling configuration may indicate a first downlink control channel candidate on a second component carrier (e.g., first scheduling component carrier) that is linked for control channel repetition to a second downlink control channel candidate on a third component carrier (e.g., second scheduling component carrier). In this example, the second and third component carriers both include scheduling component carriers, and the first component carrier includes the scheduled component carrier.

The scheduling configuration may indicate various parameters associated with scheduling communications on the first component carrier, including search space sets for the respective downlink control channel candidates, periodicities of the respective search space sets, SCSs of the search space sets, and the like. For example, in some cases, the scheduling configuration may include an indication of a first search space set associated with the first downlink control channel candidate and a second search space set associated with the second downlink control channel candidate. In this example, the scheduling configuration may indicate that the first and second search space sets are linked for control channel repetition (e.g., PDCCH repetition) for scheduling communications on the first component carrier.

In cases where the scheduling configuration indicates search space sets associated with the respective downlink control channel candidates, the scheduling configuration may further indicate one or more parameters associated with the indicated search space sets, including search space set indexes, periodicities, number of downlink control channel candidates (e.g., PDCCH candidates), and the like. In some aspects, the first and second search space sets associated with the first and second control channel candidates, respectively, may be associated with the same (e.g., common) search space set index. Moreover, in some cases, a third search space set associated with the first component carrier (e.g., the scheduled component carrier) may also be associated with the same (e.g., common) search space set index.

For example, the scheduling configuration may indicate that the first search space set and the second search space set are associated with the same search space set index, and are therefore linked for control channel repetition. In some cases, the scheduling configuration may further indicate that a third search space set associated with the first component carrier (e.g., scheduled component carrier) is associated with the same search space set index as the first and second search space set indices. In this regard, the UE 115-*b* may be configured to determine that the first and second search space sets are linked for control channel repetition based on the respective search space sets being associated with the same search space set index. Moreover, the UE 115-*b* may be configured to determine that the first and second search space sets are linked for control channel repetition used to schedule communications on the first component carrier based on the first, second, and third search space sets all being associated with the same search space set index.

In some implementations, the first and second search space sets associated with the first and second downlink control channel candidates, respectively, may include an equal number of downlink control channel candidates. In other words, the first search space set and the second search space set may exhibit a one-to-one mapping (e.g., one-to-one linking) between PDCCH candidates. In particular, the first and second search space sets may include an equal number of downlink control channel candidates corresponding to the first component carrier (e.g., scheduled component carrier) for each aggregation level. For example, the first search space set may include a first quantity of downlink control channel candidates (e.g., PDCCH candidates) including the first downlink control channel candidate. Similarly, the second search space set may include a second quantity of downlink control channel candidates including the second downlink control channel candidate. In this example, the first quantity of downlink control channel candidates and the second quantity of downlink control channel candidates may be the same. In this regard, the first and second search space sets may include an equal number of PDCCH candidates.

In some implementations, the scheduling configuration may indicate SCSs associated with the respective component carriers (e.g., first component carrier, second component carrier, third component carrier). For example, the scheduling configuration may include an indication of a first SCS associated with the first component carrier (e.g., scheduled component carrier), and a second SCS associated with the second component carrier, the third component carrier, or both.

In some aspects, an SCS of the respective scheduling component carriers may be the same. For example, in cases where the first and second downlink control channel candidates are associated with the second and third component carriers, respectively, (e.g., the second and third component carriers include scheduling component carriers), the SCSs of the second and third component carriers may be the same (e.g., equal). By way of another example, in cases where the first and second downlink control channel candidates are associated with the second and first component carriers, respectively, (e.g., the second component carrier includes a scheduling component carrier, and the first component carrier includes both a scheduled and scheduling component carrier), the SCSs of the second and first component carriers may be the same.

In cases where the SCSs of the scheduling component carriers are equal, other parameters (e.g., periodicity, number of PDCCH candidates, number of monitoring occasions) associated with the respective search space sets may also be equal in order to maintain a one-to-one mapping/linking between PDCCH candidates of the respective search space sets. For example, in cases where the SCSs of the scheduling component carriers is the same, the scheduling configuration may further indicate a periodicity associated with both the first and second search space sets, number of monitoring occasions per slot associated with both the first and second search space sets, or both. In this regard, the scheduling configuration may indicate that the scheduling component carriers exhibit the same SCS, and further indicate that the search space sets associated with the respective scheduling component carriers exhibit the same periodicity, the same number of monitoring occasions per slot, or both.

In additional or alternative implementations, SCSs of the respective scheduling component carriers may be different. For example, in cases where the first and second downlink control channel candidates are associated with the second and third component carriers, respectively, (e.g., the second and third component carriers include scheduling component carriers), the second and third component carriers may exhibit different SCSs. By way of another example, in cases where the first and second downlink control channel candidates are associated with the second and first component carriers, respectively, (e.g., the second component carrier includes a scheduling component carrier, and the first component carrier includes both a scheduled and scheduling component carrier), the SCSs of the second and first component carriers may be different.

At 610, the UE 115-*b*, the base station 105-*b*, or both, may identify one of the downlink control channel candidates (e.g., PDCCH candidates) of the scheduling component carriers as a reference downlink control channel candidate (e.g., reference PDCCH candidate). In this regard, the UE 115-b and/or the base station 105-b may identify one of the PDCCH candidates which are linked for control channel repetition as a reference downlink control channel candidate. The UE 115-b, the base station 105-b, or both, may identify one of the downlink control channel candidates as a reference downlink control channel candidate at 610 based on receiving the scheduling configuration at 605.

In some aspects, the scheduling configuration may explicitly indicate which downlink control channel candidate is the reference downlink control channel candidate. In other words, in some cases, the scheduling configuration may include an indication of the reference downlink control channel candidate. In other cases, the UE 115-b and/or the base station 105-b may be configured to identify one of the downlink control channel candidates as a reference downlink control channel candidate based on one or more parameters associated with the scheduling component carriers, parameters associated with the respective search space sets, parameters associated with the downlink control channel candidates, or any combination thereof. Parameters used to identify the reference downlink control channel candidate may include, but are not limited to, component carrier indexes, SCSs associated with respective component carriers, relative positioning of the downlink control channel candidates in the time domain, or any combination thereof.

As discussed previously herein, the position of the reference PDCCH candidate may be used to identify other parameters for communications between the UE 115-b and the base station 105-b, including resources for feedback information (e.g., HARQ-ACK resources), payload sizes of feedback messages, offsets for scheduled communications, beams for scheduled communications, preparation times for scheduled communications, CSI computation times for scheduled communications, and the like.

At 615, the UE 115-b may monitor the search space sets configured via the scheduling configuration. The UE 115-b may monitor the respective search space sets for one or more repetitions of a control message which schedule communications on the scheduled component carrier. In particular, the UE 115-b may monitor the search space sets which are configured for control channel repetition for scheduling communications on the scheduled component carrier. In this regard, the UE 115-b may be configured to monitor the search space sets based on receiving the scheduling configuration at 605, identifying the reference PDCCH candidate at 610, or both.

The UE 115-b may be configured to monitor the search space sets based on (e.g., in accordance with) one or more parameters associated with the respective search space sets, parameters associated with the respective component carriers, or both. Parameters which may be used by the UE 115-b when monitoring the search space sets at 615 may include SCSs of the respective component carriers, periodicities associated with the respective search space sets, search space set indexes associated with the respective search space sets, or any combination thereof.

For example, a first and second PDCCH candidate which are linked for control channel repetition may be associated with a first and second search space set, respectively. The first search space set and the second search space may be associated with a first periodicity, and the second search space set may be associated with a second periodicity. The first and second periodicities may be the same or different, as described previously herein. In this example, the UE 115-b may monitor the first and second search space sets in accordance with the first periodicity and the second periodicity. Further, the UE 115-b may monitor the first and second search space sets based on (e.g., in accordance with) SCSs associated with the component carriers corresponding to the respective search space sets.

In some implementations, the UE 115-b may monitor the search space sets for control messages which schedule communications on the scheduled component carrier based on search space sets associated with the scheduled component carrier and the scheduling component carriers being associated with the same search space set index. For example, first and second scheduling component carriers may be associated with first and second search space sets, respectively, which are linked for control channel repetition for scheduling communications on a scheduled component carrier. Moreover, the scheduled component carrier may be associated with a third search space set. In this example, the first, second, and third search space sets may be associated with a common (e.g., same) search space set index. As such, the UE 115-b may be configured to monitor the first and second search space set indexes based on the first, second, and third search space indexes across the scheduling and scheduled component carriers all being associated with a common search space set index.

At 620, the UE 115-b may receive, from the base station 105-b, a first repetition of a control message. In some aspects, the control message may schedule a communication between the UE 115-b and the base station 105-b over the first component carrier (e.g., scheduled component carrier). The communication scheduled by the control message may include a PDSCH transmission, a PUSCH transmission, or both. As such, the control message may indicate an SPS release and/or a configured grant release (e.g., uplink Type 2 configured grant) on the scheduled component carrier. The control message may include a DCI message (e.g., DCI formats 0_1, 0_2, 1_1, and/or 1_2).

In some aspects, the UE 115-b may receive the first repetition of the control message within the first downlink control channel candidate which is linked for control channel repletion that was configured by the scheduling configuration. In this regard, the UE 115-b may receive the first repetition of the control message based on (e.g., in accordance with) the scheduling configuration received at 605. Additionally or alternatively, the UE 115-b may receive the first repetition of the control message at 620 based on identifying the reference downlink control channel candidate (e.g., reference PDCCH candidate) at 610, monitoring the search space sets at 615, or any combination thereof.

At 625, the UE 115-b may receive, from the base station 105-b, a second repetition of the control message which was received at 620. As such, the second repetition of the control message may schedule a communication (e.g., PDSCH/SPS release, PDSCH/configured grant release) between the UE 115-b and the base station 105-b over the first component carrier (e.g., scheduled component carrier). The control message may include a DCI message (e.g., DCI formats 0_1, 0_2, 1_1, and/or 1_2).

In some aspects, the second repetition of the control message received at 625 may include a same data payload, and may schedule the same communication, as the first repetition of the control message received at 620. In some aspects, the UE 115-b may receive the second repetition of the control message within the second downlink control channel candidate which is linked for control channel repletion that was configured by the scheduling configuration. In this regard, the UE 115-b may receive the second repetition of the control message based on (e.g., in accordance with) the scheduling configuration received at 605. Additionally or alternatively, the UE 115-*b* may receive the second repetition of the control message at 625 based on identifying the reference downlink control channel candidate (e.g., reference PDCCH candidate) at 610, monitoring the search space sets at 615, receiving the first repetition of the control message at 620, or any combination thereof.

In some cases, the UE 115-*b* may receive both the first and second repetitions of the control message at 620 and 625, respectively. In other cases, the UE 115-*b* may receive only one of the first or second repetition of the control message. For example, in some cases, interference may affect a performance of communications performed over the scheduling component carrier associated with the first PDCCH candidate, but may not affect performance of communications performed over the scheduling component carrier associated with the second PDCCH candidate. As such, in this example, the UE 115-*b* may not successfully receive the first repetition of the control message at 620, but may successfully receive the second repetition of the control message at 625.

In cases where the UE 115-*b* receives only the first or second repetition of the control message, the UE 115-*b* may demodulate/decode the single received repetition of the control message. In other cases where the UE 115-*b* receives both the first and second repetitions of the control message, the UE 115-*b* may demodulate/decode only one of the first or second repetitions of the control message. Additionally or alternatively, the UE 115-*b* may combine the first and second repetitions of the control message, as described at 630 of process flow 600.

At 630, the UE 115-*b* may perform soft-combining of the first and second repetitions of the control message received at 620 and 625. In some aspects, the UE 115-*b* may perform soft-combining (e.g., perform one or more soft-combining procedures) in order to demodulate/decode the repetitions of the control message. In particular, the UE 115-*b* may perform soft-combining of a first signal (e.g., first repetition of the control message) corresponding to the first PDCCH candidate with a second signal (e.g., second repetition of the control message) corresponding to the second PDCCH candidate.

At 635, the UE 115-*b* may transmit a feedback message to the base station 105-*b*. The UE 115-*b* may transmit the feedback message based on (e.g., in response to) receiving the at least one repetition of the control message. The feedback message may include a HARQ message (e.g., ACK, NACK). In some aspects, the UE 115-*b* may transmit the feedback message at 635 based on receiving the scheduling configuration at 605, identifying the reference PDCCH candidate at 610, monitoring the search space sets at 615, receiving the first and/or second repetitions of the control message at 620 and/or 625, performing the soft-combining at 630, or any combination thereof.

In some aspects, the UE 115-*b* may determine one or more parameters/characteristics associated with the feedback message based on the identified reference PDCCH candidate. Parameters/characteristics of the feedback message which may be determined based on the reference PDCCH candidate may include, but are not limited to, resources for transmitting the feedback message, a payload size of the feedback message, or any combination thereof.

At 640, the UE 115-*b* may perform (e.g., transmit, receive) the communication which was scheduled by the one or more repetitions of the control message over the scheduled component carrier. For example, in cases where the scheduled communication includes a PUSCH transmission, the UE 115-*a* may transmit the scheduled PUSCH transmission to the base station 105-*b* at 640 over the scheduled component carrier. By way of another example, example, in cases where the scheduled communication includes a PDSCH transmission, the UE 115-*a* may receive the scheduled PDSCH transmission from the base station 105-*b* at 640 over the scheduled component carrier.

The UE 115-*b* and the base station 105-*b* may perform the scheduled communication at 640 based on transmitting/receiving the scheduling configuration at 605, identifying the reference PDCCH candidate at 610, monitoring the search space sets at 615, transmitting/receiving the repetition(s) of the control message at 620 and 625, performing the soft-combining at 630, transmitting/receiving the feedback message at 635, or any combination thereof.

In some aspects, the UE 115-*b* may determine one or more parameters/characteristics associated with the scheduled communication based on the identified reference PDCCH candidate. Parameters/characteristics of the scheduled communication which may be determined based on the reference PDCCH candidate may include, but are not limited to, an offset (e.g., slot offset) for the scheduled communication, a beam for the scheduled communication, a preparation time for the scheduled communication, a CSI computation time for the scheduled communication, or any combination thereof.

Techniques described herein may provide for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

Figure 7:
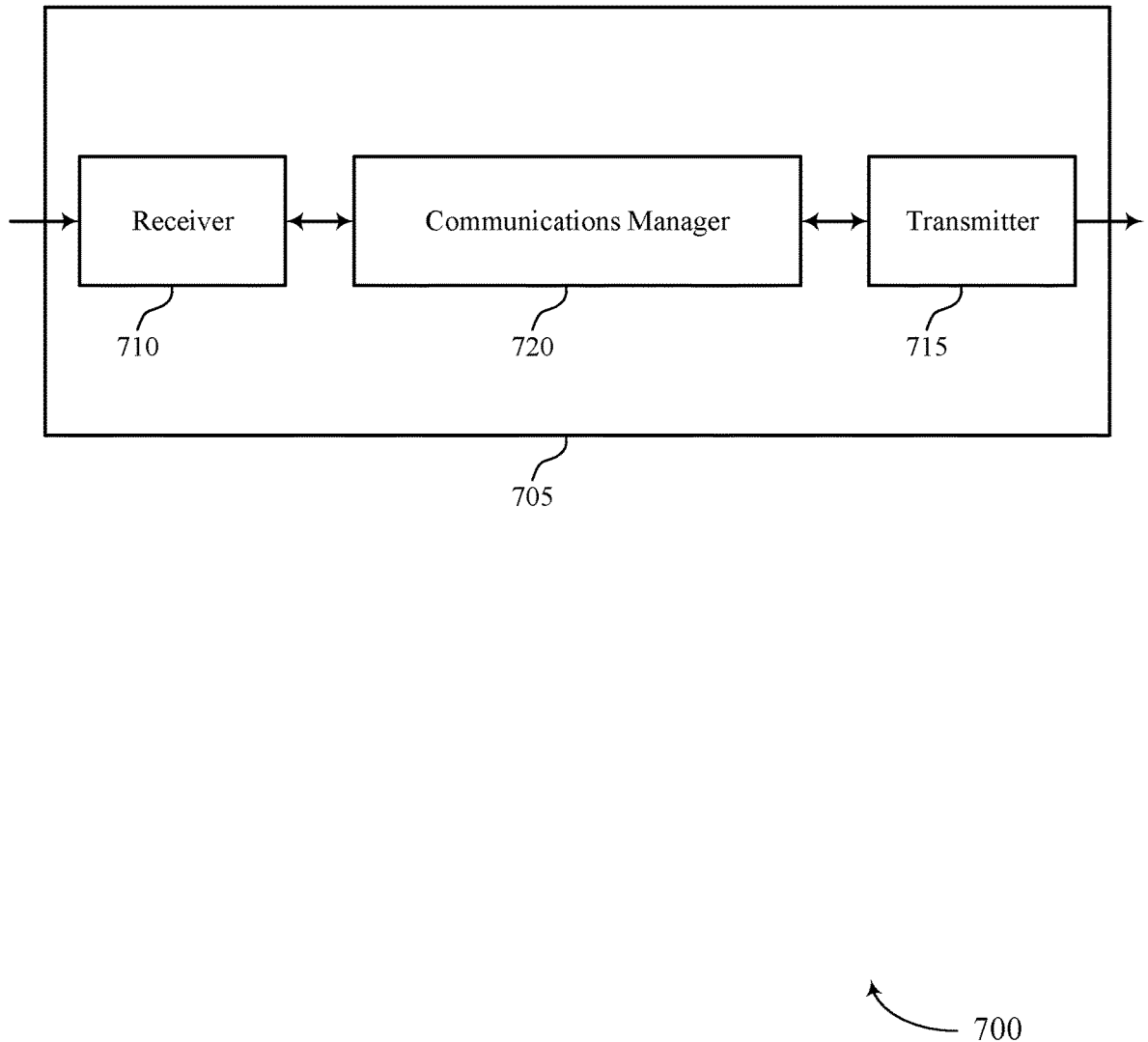
FIGS. 7 and 8 show block diagrams of devices that support techniques for control channel repetition across component carriers in accordance with aspects of the present disclosure.

FIG. 7 shows a block diagram 700 of a device 705 that supports techniques for control channel repetition across component carriers in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for control channel repetition across component carriers). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for control channel repetition across component carriers). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for control channel repetition across component carriers as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The communications manager 720 may be configured as or otherwise support a means for receiving, from the base station and based on the scheduling configuration, at least one repetition of a control message in the first downlink control channel candidate or the second downlink control channel candidate, the control message scheduling a communication between the base station and the UE over the first component carrier. The communications manager 720 may be configured as or otherwise support a means for transmitting or receiving the communication with the base station over the first component carrier.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

Figure 8:
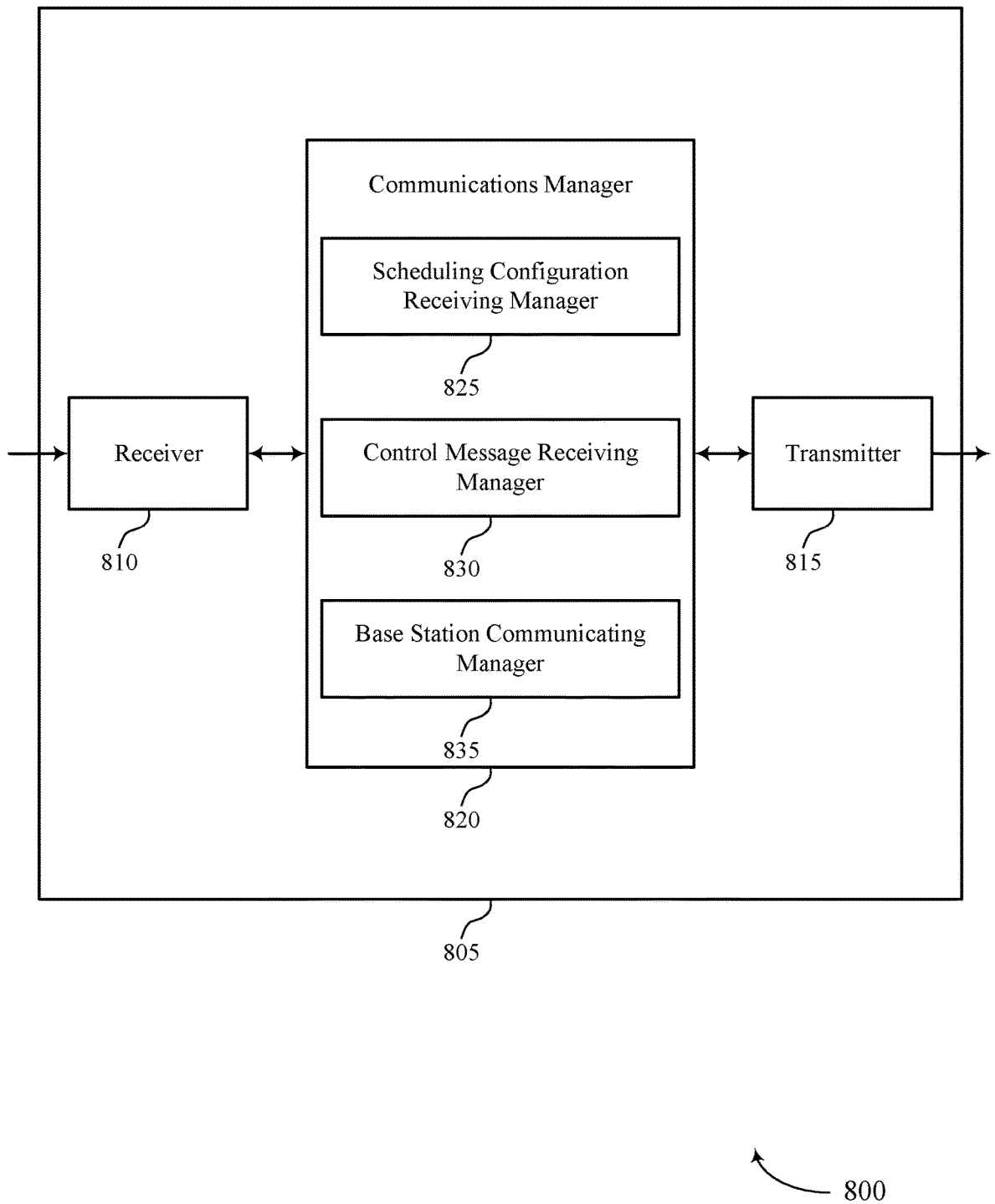

FIG. 8 shows a block diagram 800 of a device 805 that supports techniques for control channel repetition across component carriers in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for control channel repetition across component carriers). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for control channel repetition across component carriers). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for control channel repetition across component carriers as described herein. For example, the communications manager 820 may include a scheduling configuration receiving manager 825, a control message receiving manager 830, a base station communicating manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The scheduling configuration receiving manager 825 may be configured as or otherwise support a means for receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The control message receiving manager 830 may be configured as or otherwise support a means for receiving, from the base station and based on the scheduling configuration, at least one repetition of a control message in the first downlink control channel candidate or the second downlink control channel candidate, the control message scheduling a communication between the base station and the UE over the first component carrier. The base station communicating manager 835 may be configured as or otherwise support a means for transmitting or receiving the communication with the base station over the first component carrier.

Figure 9:
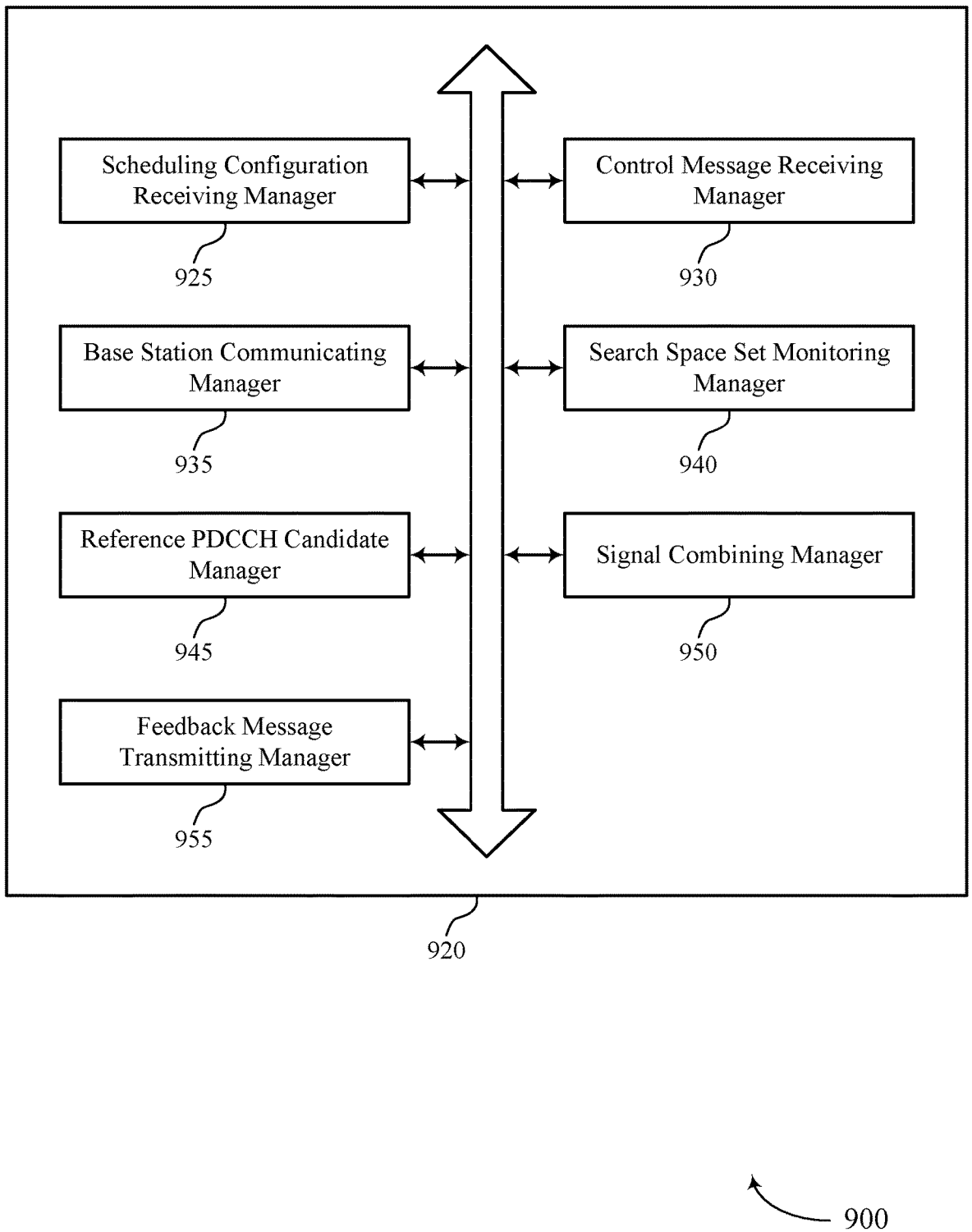
FIG. 9 shows a block diagram of a communications manager that supports techniques for control channel repetition across component carriers in accordance with aspects of the present disclosure.

FIG. 9 shows a block diagram 900 of a communications manager 920 that supports techniques for control channel repetition across component carriers in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for control channel repetition across component carriers as described herein. For example, the communications manager 920 may include a scheduling configuration receiving manager 925, a control message receiving manager 930, a base station communicating manager 935, a search space set monitoring manager 940, a reference PDCCH candidate manager 945, a signal combining manager 950, a feedback message transmitting manager 955, or any combination thereof. Each of these components may communicate, directly or indirectly, with one another (e.g., via one or more buses).

The communications manager 920 may support wireless communication at a UE in accordance with examples as disclosed herein. The scheduling configuration receiving manager 925 may be configured as or otherwise support a means for receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The control message receiving manager 930 may be configured as or otherwise support a means for receiving, from the base station and based on the scheduling configuration, at least one repetition of a control message in the first downlink control channel candidate or the second downlink control channel candidate, the control message scheduling a communication between the base station and the UE over the first component carrier. The base station communicating manager 935 may be configured as or otherwise support a means for transmitting or receiving the communication with the base station over the first component carrier.

In some examples, the scheduling configuration receiving manager 925 may be configured as or otherwise support a means for receiving, via the scheduling configuration, an indication of a first search space set associated with the first downlink control channel candidate and a second search space set associated with the second downlink control channel candidate. In some examples, the search space set monitoring manager 940 may be configured as or otherwise support a means for monitoring the first search space set and the second search space set based on the indication of the first search space set and the second search space set, where receiving the at least one repetition of the control message is based on the monitoring.

In some examples, the scheduling configuration receiving manager 925 may be configured as or otherwise support a means for receiving, via the scheduling configuration, an indication of a first subcarrier spacing of the first component carrier and a second subcarrier spacing of the second or third component carrier, where the monitoring is based on the indication of the first subcarrier spacing and the second subcarrier spacing.

In some examples, the first subcarrier spacing and the second subcarrier spacing are the same, and the scheduling configuration receiving manager 925 may be configured as or otherwise support a means for receiving, via the scheduling configuration, an indication of a periodicity associated with both the first search space set and the second search space set, where the monitoring is based on the periodicity.

In some examples, the first subcarrier spacing is different from the second subcarrier spacing, and the scheduling configuration receiving manager 925 may be configured as or otherwise support a means for receiving, via the scheduling configuration, an indication of a first periodicity associated with the first search space set and a second periodicity associated with the second search space set, where the first periodicity is different from the second periodicity, where the monitoring is based on the first periodicity, the second periodicity, or both. In some examples, a first ratio between the first subcarrier spacing and the second subcarrier spacing is the same as a second ratio between the first periodicity and the second periodicity.

In some examples, the first search space set includes a first quantity of downlink control channel candidates including the first downlink control channel candidate, and the second search space set includes a second quantity of downlink control channel candidates including the second downlink control channel candidate. In some examples, the first quantity and the second quantity are the same.

In some examples, the first search space set and the second search space set are associated with a common search space set index.

In some examples, the scheduling configuration receiving manager 925 may be configured as or otherwise support a means for receiving, via the scheduling configuration, an indication of a third search space set associated with the first component carrier, the third search space set associated with the common search space set index, where monitoring the first search space set and the second search space set is based on the first search space set, the second search space set, and the third search space set being associated with the common search space set index.

In some examples, to support receiving the at least one repetition of the control message, the control message receiving manager 930 may be configured as or otherwise support a means for receiving a first repetition of the control message in the first downlink control channel candidate. In some examples, to support receiving the at least one repetition of the control message, the control message receiving manager 930 may be configured as or otherwise support a means for receiving a second repetition of the control message in the second downlink control channel candidate, where transmitting or receiving the communication is based on receiving the first repetition of the control message, the second repetition of the control message, or both.

In some examples, the signal combining manager 950 may be configured as or otherwise support a means for performing soft-combining of a first signal corresponding to the first downlink control channel candidate with a second signal corresponding to the second downlink control channel candidate to decode the control message.

In some examples, the reference PDCCH candidate manager 945 may be configured as or otherwise support a means for identifying one of the first downlink control channel candidate or the second downlink control channel candidate as a reference downlink control channel candidate.

In some examples, the scheduling configuration receiving manager 925 may be configured as or otherwise support a means for receiving, via the scheduling configuration, an indication of the reference downlink control channel candidate, where identifying one of the first downlink control channel candidate or the second downlink control channel candidate as the reference downlink control channel candidate is based on the scheduling configuration.

In some examples, the first downlink control channel candidate is associated with a first search space set and the second downlink control channel candidate is associated with a second search space set, and the reference PDCCH candidate manager 945 may be configured as or otherwise support a means for identifying one of the first downlink control channel candidate or the second downlink control channel candidate as the reference downlink control channel candidate based on a one or more parameters associated with the first component carrier, the second component carrier, the third component carrier, or any combination thereof, the one or more parameters including a component carrier index, a subcarrier spacing, or both.

In some examples, the reference PDCCH candidate manager 945 may be configured as or otherwise support a means for identifying one of the first downlink control channel candidate or the second downlink control channel candidate as the reference downlink control channel candidate based on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

In some examples, the feedback message transmitting manager 955 may be configured as or otherwise support a means for transmitting a feedback message responsive to the at least one repetition of the control message within a resource which is determined based on the reference downlink control channel candidate. In some examples, the feedback message transmitting manager 955 may be configured as or otherwise support a means for transmitting a feedback message with a payload size that is determined based on a downlink assignment index, where the downlink assignment index is based on the reference downlink control channel candidate.

In some examples, to support transmitting or receiving the communication, the base station communicating manager 935 may be configured as or otherwise support a means for transmitting or receiving the communication with the base station within a slot that is offset relative to the reference downlink control channel candidate. In some examples, to support transmitting or receiving the communication, the base station communicating manager 935 may be configured as or otherwise support a means for transmitting or receiving the communication with the base station based on a beam which is determined based on the reference downlink control channel candidate.

In some examples, to support transmitting or receiving the communication, the base station communicating manager 935 may be configured as or otherwise support a means for transmitting or receiving the communication based on a preparation time associated with the communication which is determined based on the reference downlink control channel candidate, a channel state information computation time associated with the communication which is determined based on the reference downlink control channel candidate, or both.

In some examples, the control message includes a downlink control information message. In some examples, transmitting or receiving the communication is based on the at least one repetition of the control message.

Figure 10:
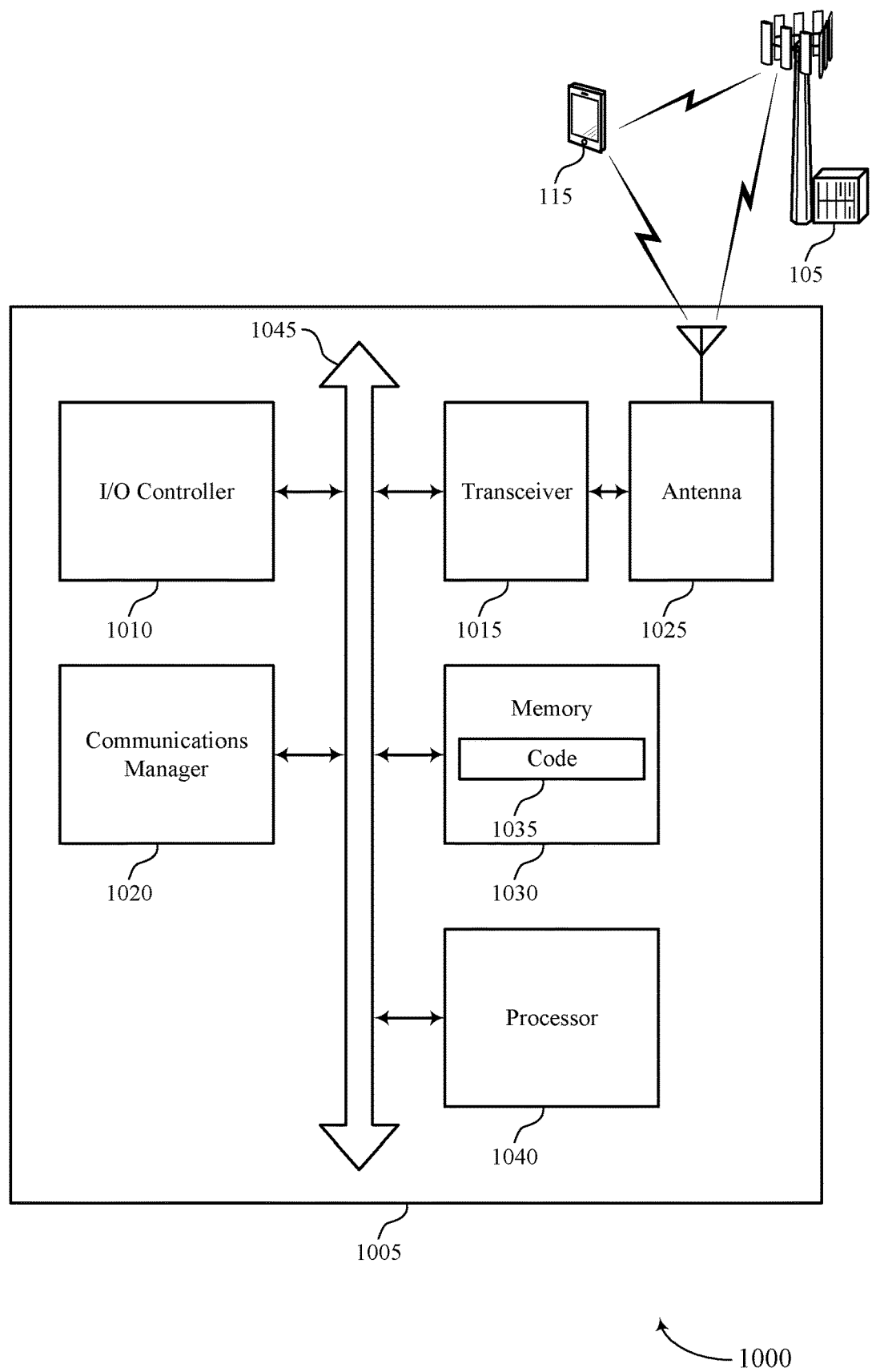
FIG. 10 shows a diagram of a system including a device that supports techniques for control channel repetition across component carriers in accordance with aspects of the present disclosure.

FIG. 10 shows a diagram of a system 1000 including a device 1005 that supports techniques for control channel repetition across component carriers in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for control channel repetition across component carriers). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The communications manager 1020 may be configured as or otherwise support a means for receiving, from the base station and based on the scheduling configuration, at least one repetition of a control message in the first downlink control channel candidate or the second downlink control channel candidate, the control message scheduling a communication between the base station and the UE over the first component carrier. The communications manager 1020 may be configured as or otherwise support a means for transmitting or receiving the communication with the base station over the first component carrier.

By including or configuring the communications manager 1020 in accordance with examples as described herein, the device 1005 may support techniques for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for control channel repetition across component carriers as described herein, or the processor 1040 and the memory 1030 may be otherwise configured to perform or support such operations.

Figure 11:
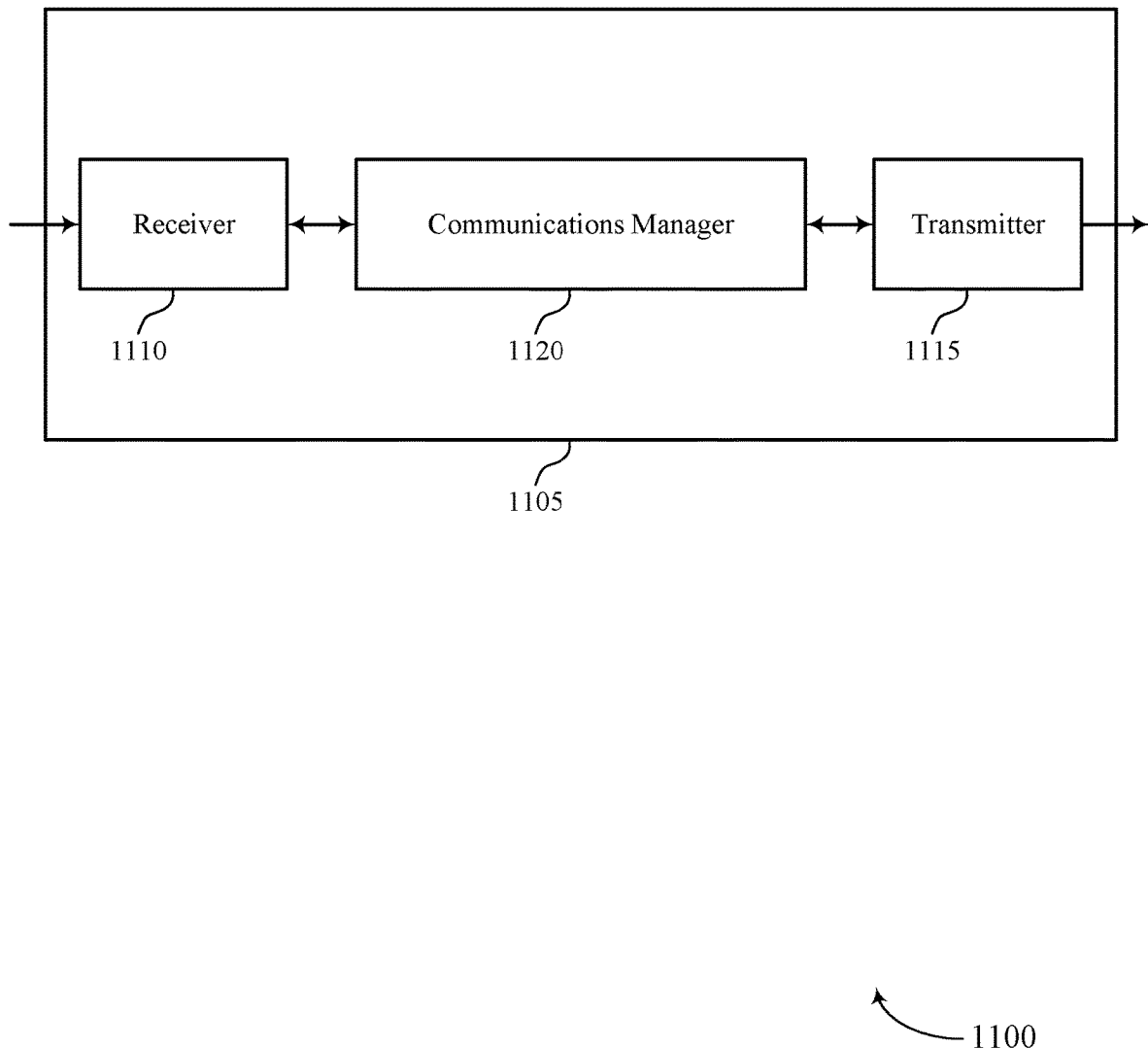
FIGS. 11 and 12 show block diagrams of devices that support techniques for control channel repetition across component carriers in accordance with aspects of the present disclosure.

FIG. 11 shows a block diagram 1100 of a device 1105 that supports techniques for control channel repetition across component carriers in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for control channel repetition across component carriers). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for control channel repetition across component carriers). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for control channel repetition across component carriers as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The communications manager 1120 may be configured as or otherwise support a means for transmitting, to the UE and based on the scheduling configuration, at least one repetition of a control message in the first downlink control channel candidate or the second downlink control channel candidate, the control message scheduling a communication between the base station and the UE over the first component carrier. The communications manager 1120 may be configured as or otherwise support a means for transmitting or receiving the communication with the UE over the first component carrier.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

Figure 12:
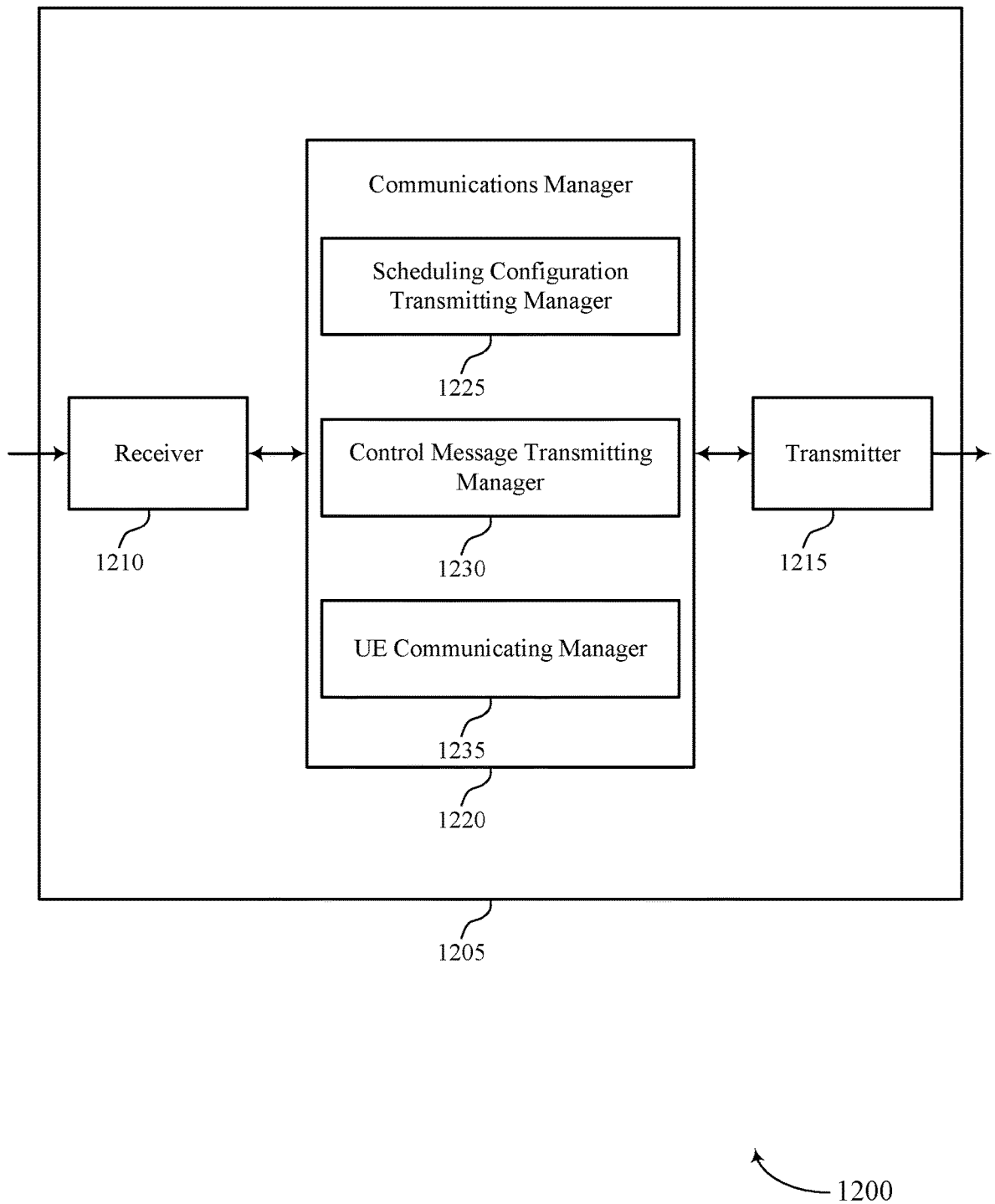

FIG. 12 shows a block diagram 1200 of a device 1205 that supports techniques for control channel repetition across component carriers in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for control channel repetition across component carriers). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for control channel repetition across component carriers). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for control channel repetition across component carriers as described herein. For example, the communications manager 1220 may include a scheduling configuration transmitting manager 1225, a control message transmitting manager 1230, a UE communicating manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The scheduling configuration transmitting manager 1225 may be configured as or otherwise support a means for transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The control message transmitting manager 1230 may be configured as or otherwise support a means for transmitting, to the UE and based on the scheduling configuration, at least one repetition of a control message in the first downlink control channel candidate or the second downlink control channel candidate, the control message scheduling a communication between the base station and the UE over the first component carrier. The UE communicating manager 1235 may be configured as or otherwise support a means for transmitting or receiving the communication with the UE over the first component carrier.

Figure 13:
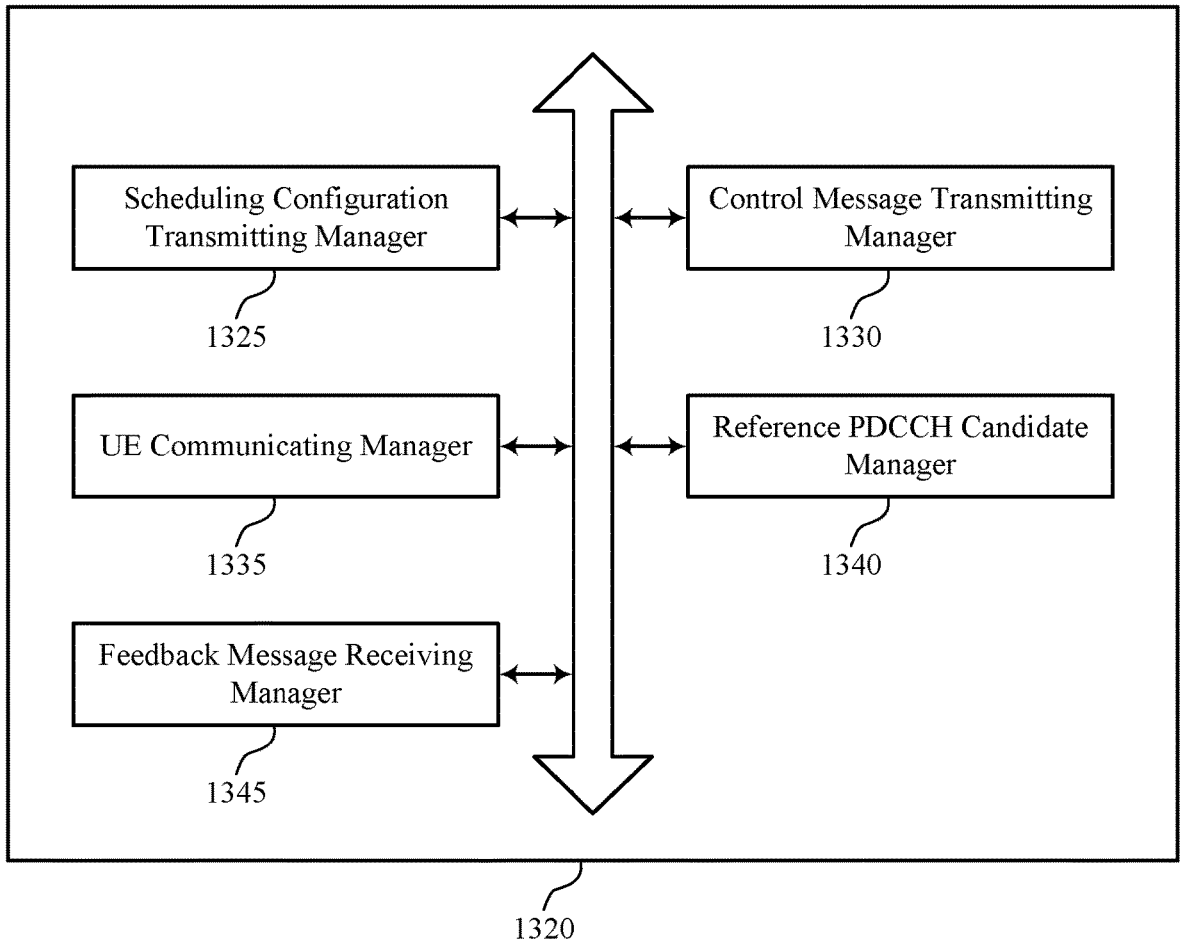
FIG. 13 shows a block diagram of a communications manager that supports techniques for control channel repetition across component carriers in accordance with aspects of the present disclosure.

FIG. 13 shows a block diagram 1300 of a communications manager 1320 that supports techniques for control channel repetition across component carriers in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for control channel repetition across component carriers as described herein. For example, the communications manager 1320 may include a scheduling configuration transmitting manager 1325, a control message transmitting manager 1330, a UE communicating manager 1335, a reference PDCCH candidate manager 1340, a feedback message receiving manager 1345, or any combination thereof. Each of these components may communicate, directly or indirectly, with one another (e.g., via one or more buses).

The communications manager 1320 may support wireless communication at a base station in accordance with examples as disclosed herein. The scheduling configuration transmitting manager 1325 may be configured as or otherwise support a means for transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The control message transmitting manager 1330 may be configured as or otherwise support a means for transmitting, to the UE and based on the scheduling configuration, at least one repetition of a control message in the first downlink control channel candidate or the second downlink control channel candidate, the control message scheduling a communication between the base station and the UE over the first component carrier. The UE communicating manager 1335 may be configured as or otherwise support a means for transmitting or receiving the communication with the UE over the first component carrier.

In some examples, the scheduling configuration transmitting manager 1325 may be configured as or otherwise support a means for transmitting, via the scheduling configuration, an indication of a first search space set associated with the first downlink control channel candidate and a second search space set associated with the second downlink control channel candidate, where transmitting the at least one repetition of the control message is based on the first search space set, the second search space set, or both.

In some examples, the scheduling configuration transmitting manager 1325 may be configured as or otherwise support a means for transmitting, via the scheduling configuration, an indication of a first subcarrier spacing of the first component carrier and a second subcarrier spacing of the second or third component carrier, where transmitting the at least one repetition of the control message is based on the first subcarrier spacing, the second subcarrier spacing, or both.

In some examples, the first subcarrier spacing and the second subcarrier spacing are the same, and the scheduling configuration transmitting manager 1325 may be configured as or otherwise support a means for transmitting, via the scheduling configuration, an indication of a periodicity associated with both the first search space set and the second search space set, where transmitting the at least one repetition of the control message is based on the periodicity.

In some examples, the first subcarrier spacing is different from the second subcarrier spacing, and the scheduling configuration transmitting manager 1325 may be configured as or otherwise support a means for transmitting, via the scheduling configuration, an indication of a first periodicity associated with the first search space set and a second periodicity associated with the second search space set, where the first periodicity is different from the second periodicity, where transmitting the at least one repetition of the control message is based on the first periodicity, the second periodicity, or both. In some examples, a first ratio between the first subcarrier spacing and the second subcarrier spacing is the same as a second ratio between the first periodicity and the second periodicity.

In some examples, the first search space set includes a first quantity of downlink control channel candidates including the first downlink control channel candidate, and the second search space set includes a second quantity of downlink control channel candidates including the second downlink control channel candidate. In some examples, the first quantity and the second quantity are the same. In some examples, the first search space set and the second search space set are associated with a common search space set index.

In some examples, the scheduling configuration transmitting manager 1325 may be configured as or otherwise support a means for transmitting, via the scheduling configuration, an indication of a third search space set associated with the first component carrier, the third search space set associated with the common search space set index.

In some examples, to support transmitting the at least one repetition of the control message, the control message transmitting manager 1330 may be configured as or otherwise support a means for transmitting a first repetition of the control message in the first downlink control channel candidate. In some examples, to support transmitting the at least one repetition of the control message, the control message transmitting manager 1330 may be configured as or otherwise support a means for transmitting a second repetition of the control message in the second downlink control channel candidate, where transmitting or receiving the communication is based on transmitting the first repetition of the control message, the second repetition of the control message, or both.

In some examples, the reference PDCCH candidate manager 1340 may be configured as or otherwise support a means for identifying one of the first downlink control channel candidate or the second downlink control channel candidate as a reference downlink control channel candidate.

In some examples, the scheduling configuration transmitting manager 1325 may be configured as or otherwise support a means for transmitting, via the scheduling configuration, an indication of the reference downlink control channel candidate, where identifying one of the first downlink control channel candidate or the second downlink control channel candidate as the reference downlink control channel candidate is based on the scheduling configuration.

In some examples, the first downlink control channel candidate is associated with a first search space set and the second downlink control channel candidate is associated with a second search space set, and the reference PDCCH candidate manager 1340 may be configured as or otherwise support a means for identifying one of the first downlink control channel candidate or the second downlink control channel candidate as the reference downlink control channel candidate based on one or more parameters associated with the first component carrier, the second component carrier, the third component carrier, or any combination thereof, the one or more parameters including a component carrier index, a subcarrier spacing, or both.

In some examples, the reference PDCCH candidate manager 1340 may be configured as or otherwise support a means for identifying one of the first downlink control channel candidate or the second downlink control channel candidate as the reference downlink control channel candidate based on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

In some examples, the feedback message receiving manager 1345 may be configured as or otherwise support a means for receiving a feedback message responsive to the at least one repetition of the control message within a resource which is determined based on the reference downlink control channel candidate.

In some examples, the feedback message receiving manager 1345 may be configured as or otherwise support a means for receiving a feedback message with a payload size that is determined based on a downlink assignment index, where the downlink assignment index is based on the reference downlink control channel candidate.

In some examples, to support transmitting or receiving the communication, the UE communicating manager 1335 may be configured as or otherwise support a means for transmitting or receiving the communication with the UE within a slot that is offset relative to the reference downlink control channel candidate. In some examples, to support transmitting or receiving the communication, the UE communicating manager 1335 may be configured as or otherwise support a means for transmitting or receiving the communication with the UE based on a beam which is determined based on the reference downlink control channel candidate.

In some examples, to support transmitting or receiving the communication, the UE communicating manager 1335 may be configured as or otherwise support a means for transmitting or receiving the communication based on a preparation time associated with the communication which is determined based on the reference downlink control channel candidate, a channel state information computation time associated with the communication which is determined based on the reference downlink control channel candidate, or both.

In some examples, the control message includes a downlink control information message. In some examples, transmitting or receiving the communication is based on the at least one repetition of the control message.

Figure 14:
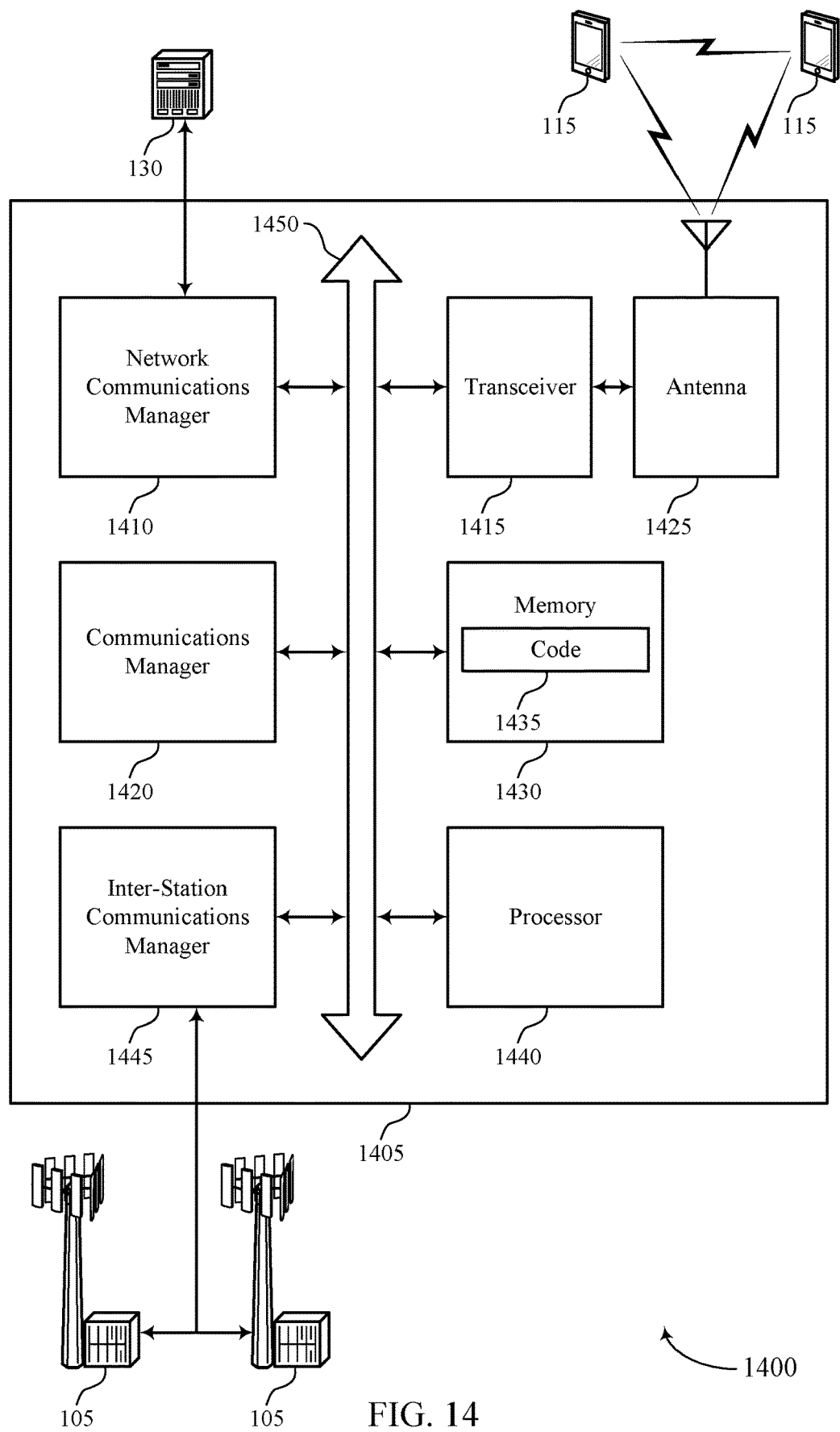
FIG. 14 shows a diagram of a system including a device that supports techniques for control channel repetition across component carriers in accordance with aspects of the present disclosure.

FIG. 14 shows a diagram of a system 1400 including a device 1405 that supports techniques for control channel repetition across component carriers in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for control channel repetition across component carriers). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The communications manager 1420 may be configured as or otherwise support a means for transmitting, to the UE and based on the scheduling configuration, at least one repetition of a control message in the first downlink control channel candidate or the second downlink control channel candidate, the control message scheduling a communication between the base station and the UE over the first component carrier. The communications manager 1420 may be configured as or otherwise support a means for transmitting or receiving the communication with the UE over the first component carrier.

By including or configuring the communications manager 1420 in accordance with examples as described herein, the device 1405 may support techniques for improved cross-carrier scheduling. In particular, techniques described herein may enable the use of PDCCH repetition in the context of cross-carrier scheduling, which may enable multiple PDCCH repetitions across multiple scheduling component carriers to schedule communications within a scheduled component carrier. By enabling PDCCH repetition in the context of cross-carrier scheduling, techniques described herein may improve transmission diversity (e.g., frequency diversity, beam diversity) of control messages used for cross-carrier scheduling. As such, by improving transmission diversity and enabling multiple repetitions of control signaling to schedule communications on a scheduled component carrier, techniques described herein may improve reliability of control signaling used for cross-carrier scheduling, which may enable more efficient and widespread use of cross-carrier scheduling.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for control channel repetition across component carriers as described herein, or the processor 1440 and the memory 1430 may be otherwise configured to perform or support such operations.

Figure 15:
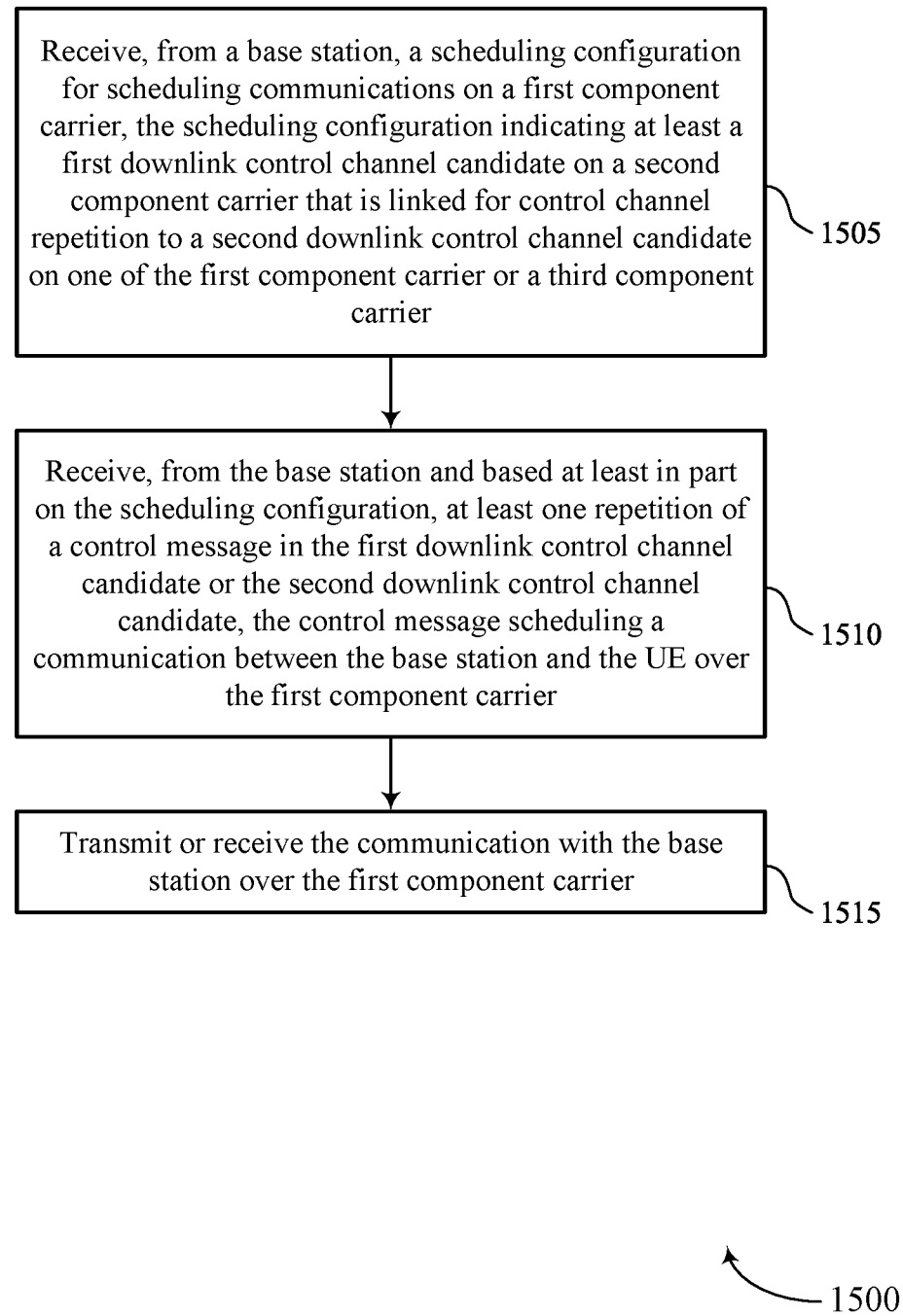
FIGS. 15 through 18 show flowcharts illustrating methods that support techniques for control channel repetition across component carriers in accordance with aspects of the present disclosure.

FIG. 15 shows a flowchart illustrating a method 1500 that supports techniques for control channel repetition across component carriers in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The operations of 1505 may be performed in accordance with examples as disclosed herein. In some examples, aspects of the operations of 1505 may be performed by a scheduling configuration receiving manager 925 as described with reference to FIG. 9.

At 1510, the method may include receiving, from the base station and based on the scheduling configuration, at least one repetition of a control message in the first downlink control channel candidate or the second downlink control channel candidate, the control message scheduling a communication between the base station and the UE over the first component carrier. The operations of 1510 may be performed in accordance with examples as disclosed herein. In some examples, aspects of the operations of 1510 may be performed by a control message receiving manager 930 as described with reference to FIG. 9.

At 1515, the method may include transmitting or receiving the communication with the base station over the first component carrier. The operations of 1515 may be performed in accordance with examples as disclosed herein. In some examples, aspects of the operations of 1515 may be performed by a base station communicating manager 935 as described with reference to FIG. 9.

Figure 16:
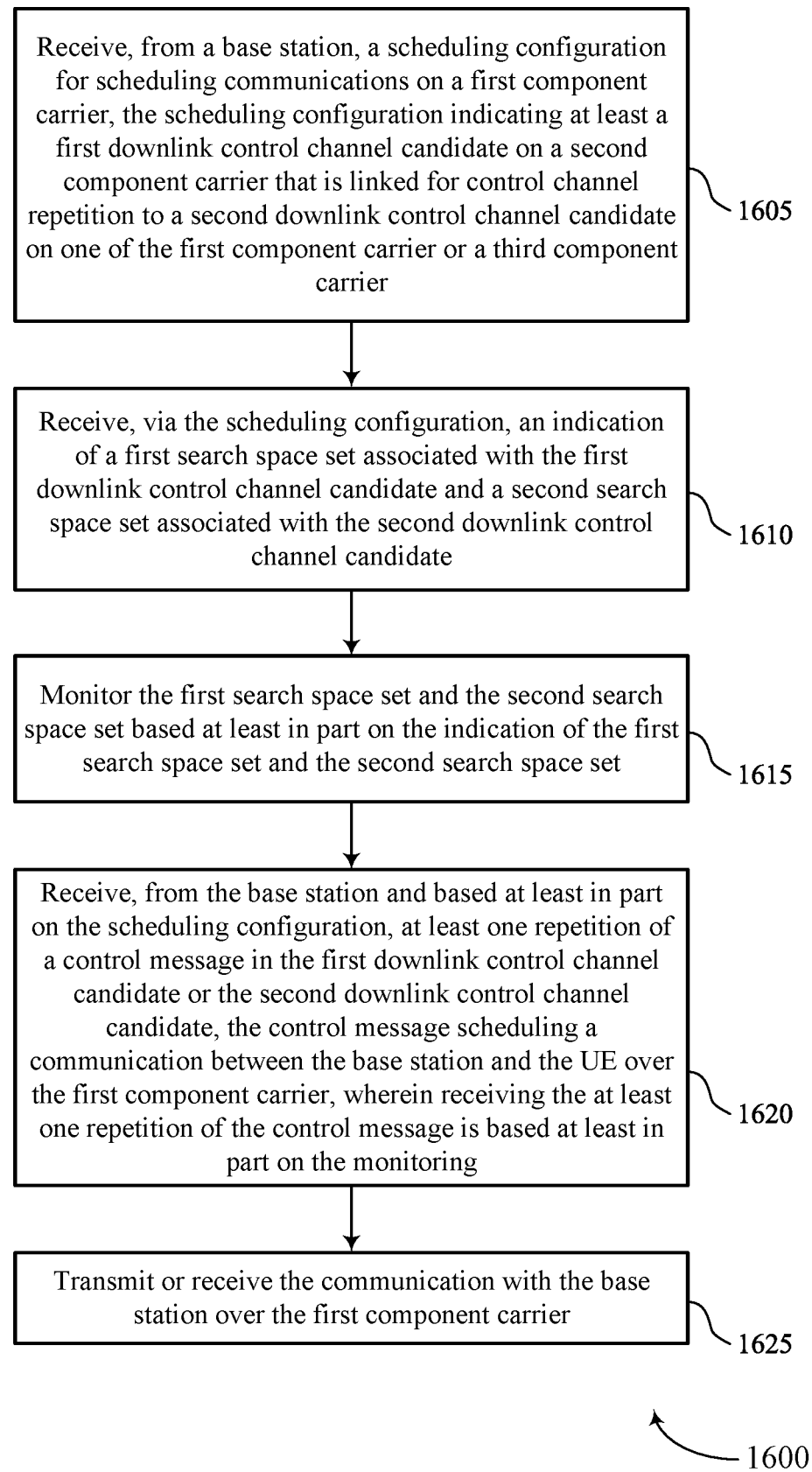

FIG. 16 shows a flowchart illustrating a method 1600 that supports techniques for control channel repetition across component carriers in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The operations of 1605 may be performed in accordance with examples as disclosed herein. In some examples, aspects of the operations of 1605 may be performed by a scheduling configuration receiving manager 925 as described with reference to FIG. 9.

At 1610, the method may include receiving, via the scheduling configuration, an indication of a first search space set associated with the first downlink control channel candidate and a second search space set associated with the second downlink control channel candidate. The operations of 1610 may be performed in accordance with examples as disclosed herein. In some examples, aspects of the operations of 1610 may be performed by a scheduling configuration receiving manager 925 as described with reference to FIG. 9.

At 1615, the method may include monitoring the first search space set and the second search space set based on the indication of the first search space set and the second search space set. The operations of 1615 may be performed in accordance with examples as disclosed herein. In some examples, aspects of the operations of 1615 may be performed by a search space set monitoring manager 940 as described with reference to FIG. 9.

At 1620, the method may include receiving, from the base station and based on the scheduling configuration, at least one repetition of a control message in the first downlink control channel candidate or the second downlink control channel candidate, the control message scheduling a communication between the base station and the UE over the first component carrier, where receiving the at least one repetition of the control message is based on the monitoring. The operations of 1620 may be performed in accordance with examples as disclosed herein. In some examples, aspects of the operations of 1620 may be performed by a control message receiving manager 930 as described with reference to FIG. 9.

At 1625, the method may include transmitting or receiving the communication with the base station over the first component carrier. The operations of 1625 may be performed in accordance with examples as disclosed herein. In some examples, aspects of the operations of 1625 may be performed by a base station communicating manager 935 as described with reference to FIG. 9.

Figure 17:
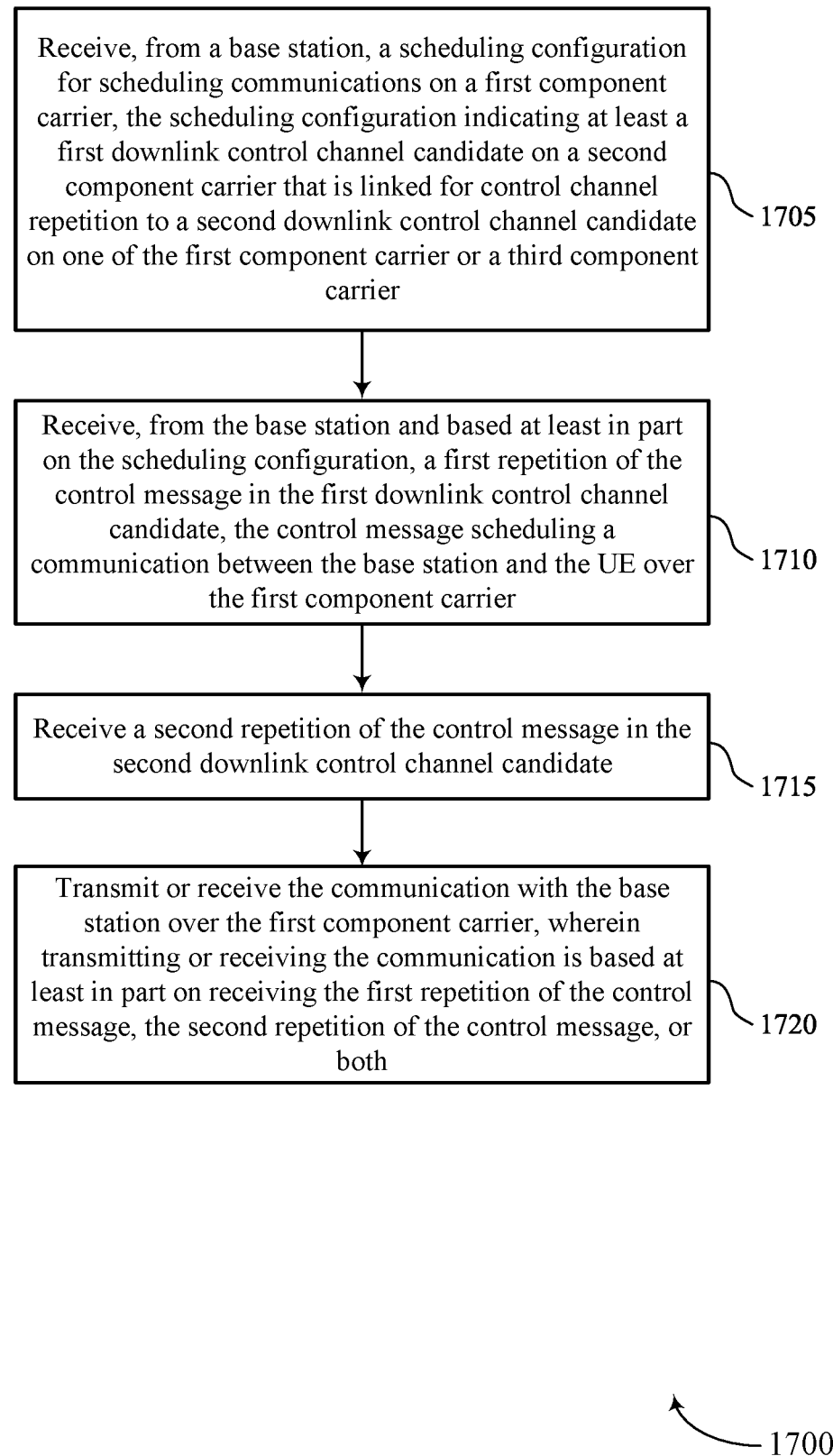

FIG. 17 shows a flowchart illustrating a method 1700 that supports techniques for control channel repetition across component carriers in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The operations of 1705 may be performed in accordance with examples as disclosed herein. In some examples, aspects of the operations of 1705 may be performed by a scheduling configuration receiving manager 925 as described with reference to FIG. 9.

At 1710, the method may include receiving, from the base station and based on the scheduling configuration, a first repetition of the control message in the first downlink control channel candidate, the control message scheduling a communication between the base station and the UE over the first component carrier. The operations of 1710 may be performed in accordance with examples as disclosed herein. In some examples, aspects of the operations of 1710 may be performed by a control message receiving manager 930 as described with reference to FIG. 9.

At 1715, the method may include receiving a second repetition of the control message in the second downlink control channel candidate. The operations of 1715 may be performed in accordance with examples as disclosed herein. In some examples, aspects of the operations of 1715 may be performed by a control message receiving manager 930 as described with reference to FIG. 9.

At 1720, the method may include transmitting or receiving the communication with the base station over the first component carrier, where transmitting or receiving the communication is based on receiving the first repetition of the control message, the second repetition of the control message, or both. The operations of 1720 may be performed in accordance with examples as disclosed herein. In some examples, aspects of the operations of 1720 may be performed by a base station communicating manager 935 as described with reference to FIG. 9.

Figure 18:
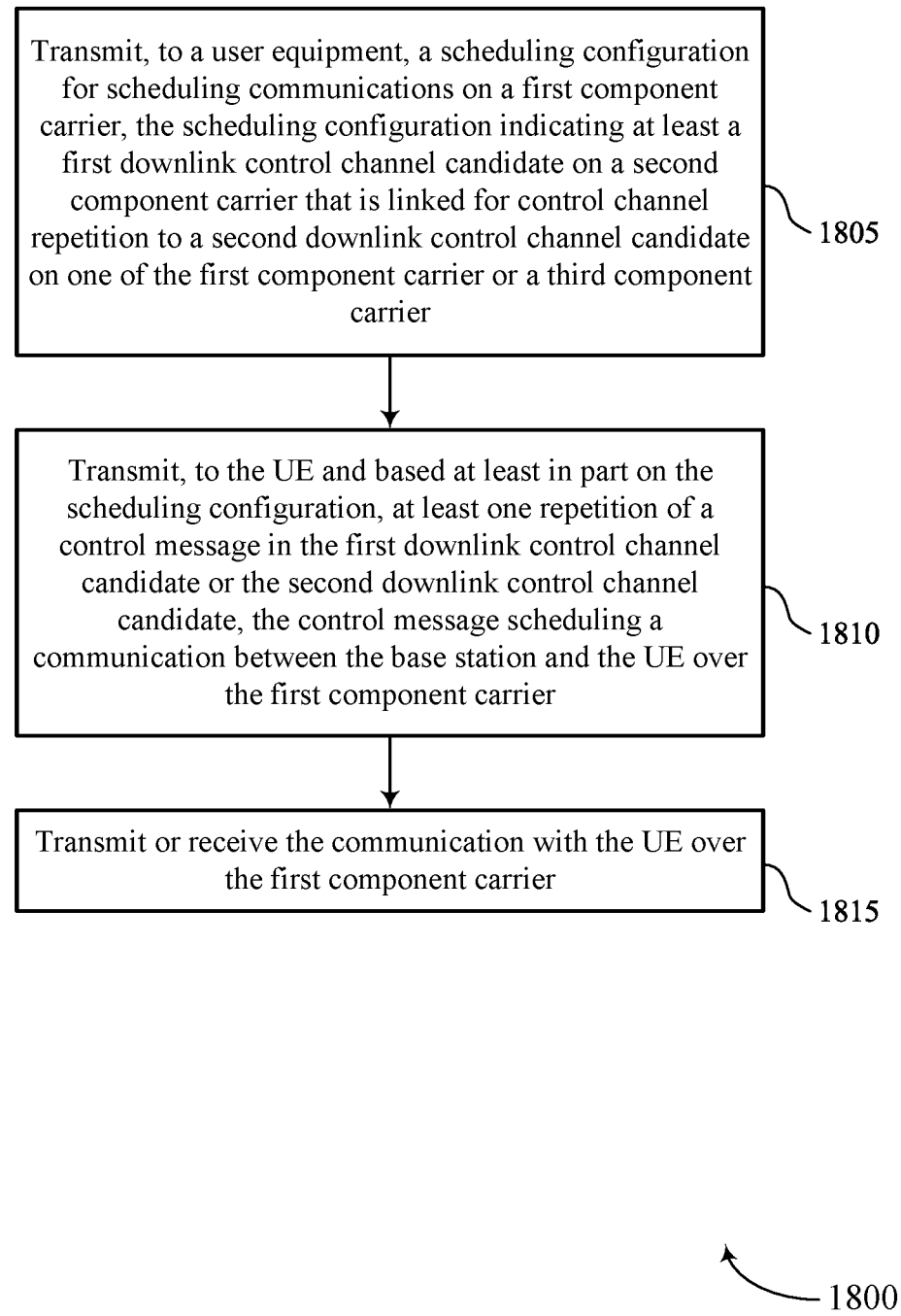

FIG. 18 shows a flowchart illustrating a method 1800 that supports techniques for control channel repetition across component carriers in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier. The operations of 1805 may be performed in accordance with examples as disclosed herein. In some examples, aspects of the operations of 1805 may be performed by a scheduling configuration transmitting manager 1325 as described with reference to FIG. 13.

At 1810, the method may include transmitting, to the UE and based on the scheduling configuration, at least one repetition of a control message in the first downlink control channel candidate or the second downlink control channel candidate, the control message scheduling a communication between the base station and the UE over the first component carrier. The operations of 1810 may be performed in accordance with examples as disclosed herein. In some examples, aspects of the operations of 1810 may be performed by a control message transmitting manager 1330 as described with reference to FIG. 13.

At 1815, the method may include transmitting or receiving the communication with the UE over the first component carrier. The operations of 1815 may be performed in accordance with examples as disclosed herein. In some examples, aspects of the operations of 1815 may be performed by a UE communicating manager 1335 as described with reference to FIG. 13.

The following provides an overview of aspects of the present disclosure:

Aspect 1: A method for wireless communication at a UE, comprising: receiving, from a base station, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier; receiving, from the base station and based at least in part on the scheduling configuration, at least one repetition of a control message in the first downlink control channel candidate or the second downlink control channel candidate, the control message scheduling a communication between the base station and the UE over the first component carrier; and transmitting or receiving the communication with the base station over the first component carrier.

Aspect 2: The method of aspect 1, further comprising: receiving, via the scheduling configuration, an indication of a first search space set associated with the first downlink control channel candidate and a second search space set associated with the second downlink control channel candidate; and monitoring the first search space set and the second search space set based at least in part on the indication of the first search space set and the second search space set, wherein receiving the at least one repetition of the control message is based at least in part on the monitoring.

Aspect 3: The method of aspect 2, further comprising: receiving, via the scheduling configuration, an indication of a first SCS of the first component carrier and a second SCS of the second or third component carrier, wherein the monitoring is based at least in part on the indication of the first SCS and the second SCS.

Aspect 4: The method of aspect 3, wherein the first SCS and the second SCS are the same, the method further comprising: receiving, via the scheduling configuration, an indication of a periodicity associated with both the first search space set and the second search space set, wherein the monitoring is based at least in part on the periodicity.

Aspect 5: The method of any of aspects 3 through 4, wherein the first SCS is different from the second SCS, the method further comprising: receiving, via the scheduling configuration, an indication of a first periodicity associated with the first search space set and a second periodicity associated with the second search space set, wherein the first periodicity is different from the second periodicity, wherein the monitoring is based at least in part on the first periodicity, the second periodicity, or both.

Aspect 6: The method of aspect 5, wherein a first ratio between the first SCS and the second SCS is the same as a second ratio between the first periodicity and the second periodicity.

Aspect 7: The method of any of aspects 2 through 6, wherein the first search space set comprises a first quantity of downlink control channel candidates including the first downlink control channel candidate, and the second search space set comprises a second quantity of downlink control channel candidates including the second downlink control channel candidate, the first quantity and the second quantity are the same Aspect 8: The method of any of aspects 2 through 7, wherein the first search space set and the second search space set are associated with a common search space set index.

Aspect 9: The method of aspect 8, further comprising: receiving, via the scheduling configuration, an indication of a third search space set associated with the first component carrier, the third search space set associated with the common search space set index, wherein monitoring the first search space set and the second search space set is based at least in part on the first search space set, the second search space set, and the third search space set being associated with the common search space set index.

Aspect 10: The method of any of aspects 1 through 9, wherein receiving the at least one repetition of the control message comprises: receiving a first repetition of the control message in the first downlink control channel candidate; and receiving a second repetition of the control message in the second downlink control channel candidate, wherein transmitting or receiving the communication is based at least in part on receiving the first repetition of the control message, the second repetition of the control message, or both.

Aspect 11: The method of aspect 10, further comprising: performing soft-combining of a first signal corresponding to the first downlink control channel candidate with a second signal corresponding to the second downlink control channel candidate to decode the control message.

Aspect 12: The method of any of aspects 1 through 11, further comprising: identifying one of the first downlink control channel candidate or the second downlink control channel candidate as a reference downlink control channel candidate.

Aspect 13: The method of aspect 12, further comprising: receiving, via the scheduling configuration, an indication of the reference downlink control channel candidate, wherein identifying one of the first downlink control channel candidate or the second downlink control channel candidate as the reference downlink control channel candidate is based at least in part on the scheduling configuration.

Aspect 14: The method of any of aspects 12 through 13, wherein the first downlink control channel candidate is associated with a first search space set and the second downlink control channel candidate is associated with a second search space set, the method further comprising: identifying one of the first downlink control channel candidate or the second downlink control channel candidate as the reference downlink control channel candidate based at least in part on a one or more parameters associated with the first component carrier, the second component carrier, the third component carrier, or any combination thereof, the one or more parameters comprising a component carrier index, a SCS, or both.

Aspect 15: The method of any of aspects 12 through 14, further comprising: identifying one of the first downlink control channel candidate or the second downlink control channel candidate as the reference downlink control channel candidate based at least in part on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

Aspect 16: The method of any of aspects 12 through 15, further comprising: transmitting a feedback message responsive to the at least one repetition of the control message within a resource which is determined based at least in part on the reference downlink control channel candidate.

Aspect 17: The method of any of aspects 12 through 16, further comprising: transmitting a feedback message with a payload size that is determined based at least in part on a DAI, wherein the DAI is based at least in part on the reference downlink control channel candidate.

Aspect 18: The method of any of aspects 12 through 17, wherein transmitting or receiving the communication comprises: transmitting or receiving the communication with the base station within a slot that is offset relative to the reference downlink control channel candidate.

Aspect 19: The method of any of aspects 12 through 18, wherein transmitting or receiving the communication comprises: transmitting or receiving the communication with the base station based at least in part on a beam which is determined based at least in part on the reference downlink control channel candidate.

Aspect 20: The method of any of aspects 12 through 19, wherein transmitting or receiving the communication comprises: transmitting or receiving the communication based at least in part on a preparation time associated with the communication which is determined based at least in part on the reference downlink control channel candidate, a CSI computation time associated with the communication which is determined based at least in part on the reference downlink control channel candidate, or both.

Aspect 21: The method of any of aspects 1 through 20, wherein the control message comprises a DCI message.

Aspect 22: The method of any of aspects 1 through 21, wherein transmitting or receiving the communication is based at least in part on the at least one repetition of the control message.

Aspect 23: A method for wireless communication at a base station, comprising: transmitting, to a user equipment, a scheduling configuration for scheduling communications on a first component carrier, the scheduling configuration indicating at least a first downlink control channel candidate on a second component carrier that is linked for control channel repetition to a second downlink control channel candidate on one of the first component carrier or a third component carrier; transmitting, to the UE and based at least in part on the scheduling configuration, at least one repetition of a control message in the first downlink control channel candidate or the second downlink control channel candidate, the control message scheduling a communication between the base station and the UE over the first component carrier; and transmitting or receiving the communication with the UE over the first component carrier.

Aspect 24: The method of aspect 23, further comprising: transmitting, via the scheduling configuration, an indication of a first search space set associated with the first downlink control channel candidate and a second search space set associated with the second downlink control channel candidate, wherein transmitting the at least one repetition of the control message is based at least in part on the first search space set, the second search space set, or both.

Aspect 25: The method of aspect 24, further comprising: transmitting, via the scheduling configuration, an indication of a first SCS of the first component carrier and a second SCS of the second or third component carrier, wherein transmitting the at least one repetition of the control message is based at least in part on the first SCS, the second SCS, or both.

Aspect 26: The method of aspect 25, wherein the first SCS and the second SCS are the same, the method further comprising: transmitting, via the scheduling configuration, an indication of a periodicity associated with both the first search space set and the second search space set, wherein transmitting the at least one repetition of the control message is based at least in part on the periodicity.

Aspect 27: The method of any of aspects 25 through 26, wherein the first SCS is different from the second SCS, the method further comprising: transmitting, via the scheduling configuration, an indication of a first periodicity associated with the first search space set and a second periodicity associated with the second search space set, wherein the first periodicity is different from the second periodicity, wherein transmitting the at least one repetition of the control message is based at least in part on the first periodicity, the second periodicity, or both.

Aspect 28: The method of aspect 27, wherein a first ratio between the first SCS and the second SCS is the same as a second ratio between the first periodicity and the second periodicity.

Aspect 29: The method of any of aspects 24 through 28, wherein. the first search space set comprises a first quantity of downlink control channel candidates including the first downlink control channel candidate, and the second search space set comprises a second quantity of downlink control channel candidates including the second downlink control channel candidate, the first quantity and the second quantity are the same Aspect 30: The method of any of aspects 24 through 29, wherein the first search space set and the second search space set are associated with a common search space set index.

Aspect 31: The method of aspect 30, further comprising: transmitting, via the scheduling configuration, an indication of a third search space set associated with the first component carrier, the third search space set associated with the common search space set index.

Aspect 32: The method of any of aspects 23 through 31, wherein transmitting the at least one repetition of the control message comprises: transmitting a first repetition of the control message in the first downlink control channel candidate; and transmitting a second repetition of the control message in the second downlink control channel candidate, wherein transmitting or receiving the communication is based at least in part on transmitting the first repetition of the control message, the second repetition of the control message, or both.

Aspect 33: The method of any of aspects 23 through 32, further comprising: identifying one of the first downlink control channel candidate or the second downlink control channel candidate as a reference downlink control channel candidate.

Aspect 34: The method of aspect 33, further comprising: transmitting, via the scheduling configuration, an indication of the reference downlink control channel candidate, wherein identifying one of the first downlink control channel candidate or the second downlink control channel candidate as the reference downlink control channel candidate is based at least in part on the scheduling configuration.

Aspect 35: The method of any of aspects 33 through 34, wherein the first downlink control channel candidate is associated with a first search space set and the second downlink control channel candidate is associated with a second search space set, the method further comprising: identifying one of the first downlink control channel candidate or the second downlink control channel candidate as the reference downlink control channel candidate based at least in part on one or more parameters associated with the first component carrier, the second component carrier, the third component carrier, or any combination thereof, the one or more parameters comprising a component carrier index, a SCS, or both.

Aspect 36: The method of any of aspects 33 through 35, further comprising: identifying one of the first downlink control channel candidate or the second downlink control channel candidate as the reference downlink control channel candidate based at least in part on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

Aspect 37: The method of any of aspects 33 through 36, further comprising: receiving a feedback message responsive to the at least one repetition of the control message within a resource which is determined based at least in part on the reference downlink control channel candidate.

Aspect 38: The method of any of aspects 33 through 37, further comprising; receiving a feedback message with a payload size that is determined based at least in part on a DAI, wherein the DAI is based at least in part on the reference downlink control channel candidate Aspect 39: The method of any of aspects 33 through 38, wherein transmitting or receiving the communication comprises: transmitting or receiving the communication with the UE within a slot that is offset relative to the reference downlink control channel candidate.

Aspect 40: The method of any of aspects 33 through 39, wherein transmitting or receiving the communication comprises: transmitting or receiving the communication with the UE based at least in part on a beam which is determined based at least in part on the reference downlink control channel candidate.

Aspect 41: The method of any of aspects 33 through 40, wherein transmitting or receiving the communication comprises: transmitting or receiving the communication based at least in part on a preparation time associated with the communication which is determined based at least in part on the reference downlink control channel candidate, a CSI computation time associated with the communication which is determined based at least in part on the reference downlink control channel candidate, or both.

Aspect 42: The method of any of aspects 23 through 41, wherein the control message comprises a DCI message.

Aspect 43: The method of any of aspects 23 through 42, wherein transmitting or receiving the communication is based at least in part on the at least one repetition of the control message.

Aspect 44: An apparatus for wireless communication at a UE, comprising a processor; memory coupled with the processor; and instructions stored in the memory and executable by the processor to cause the apparatus to perform a method of any of aspects 1 through 22.

Aspect 45: An apparatus for wireless communication at a UE, comprising at least one means for performing a method of any of aspects 1 through 22.

Aspect 46: A non-transitory computer-readable medium storing code for wireless communication at a UE, the code comprising instructions executable by a processor to perform a method of any of aspects 1 through 22.

Aspect 47: An apparatus for wireless communication at a base station, comprising a processor; memory coupled with the processor; and instructions stored in the memory and executable by the processor to cause the apparatus to perform a method of any of aspects 23 through 43.

Aspect 48: An apparatus for wireless communication at a base station, comprising at least one means for performing a method of any of aspects 23 through 43.

Aspect 49: A non-transitory computer-readable medium storing code for wireless communication at a base station, the code comprising instructions executable by a processor to perform a method of any of aspects 23 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors, individually or collectively, to cause the apparatus to:
      receive, from a base station, a scheduling configuration for scheduling communications on a first component carrier, the scheduling configuration indicating at least a first downlink control channel candidate that is linked for control channel repetition to a second downlink control channel candidate, at least one of the first downlink control channel candidate or the second downlink control channel candidate is on a component carrier that is different from the first component carrier;
      receive, from the base station and based at least in part on the scheduling configuration, at least one repetition of a control message in the first downlink control channel candidate or the second downlink control channel candidate, the control message scheduling a communication between the base station and the UE over the first component carrier; and
      transmit or receive the communication with the base station over the first component carrier.

2. The apparatus of claim 1, wherein the instructions are further executable by the one or more processors, individually or collectively, to cause the apparatus to:
   receive, via the scheduling configuration, an indication of a first search space set associated with the first downlink control channel candidate and a second search space set associated with the second downlink control channel candidate; and
   monitor the first search space set and the second search space set based at least in part on the indication of the first search space set and the second search space set, wherein receiving the at least one repetition of the control message is based at least in part on the monitoring.

3. The apparatus of claim 2, wherein the instructions are further executable by the one or more processors, individually or collectively, to cause the apparatus to:
receive, via the scheduling configuration, an indication of a first subcarrier spacing of the first component carrier and a second subcarrier spacing of the component carrier that is different from the first component carrier, wherein the monitoring is based at least in part on the indication of the first subcarrier spacing and the second subcarrier spacing.

4. The apparatus of claim 3, wherein the first subcarrier spacing and the second subcarrier spacing are the same, and the instructions are further executable by the one or more processors, individually or collectively, to cause the apparatus to:
receive, via the scheduling configuration, an indication of a periodicity associated with both the first search space set and the second search space set, wherein the monitoring is based at least in part on the periodicity.

5. The apparatus of claim 3, wherein the first subcarrier spacing is different from the second subcarrier spacing, and the instructions are further executable by the one or more processors, individually or collectively, to cause the apparatus to:
receive, via the scheduling configuration, an indication of a first periodicity associated with the first search space set and a second periodicity associated with the second search space set, wherein the first periodicity is different from the second periodicity, wherein the monitoring is based at least in part on the first periodicity, the second periodicity, or both.

6. The apparatus of claim 5, wherein a first ratio between the first subcarrier spacing and the second subcarrier spacing is the same as a second ratio between the first periodicity and the second periodicity.

7. The apparatus of claim 2, wherein the first search space set comprises a first quantity of downlink control channel candidates including the first downlink control channel candidate, and the second search space set comprises a second quantity of downlink control channel candidates including the second downlink control channel candidate, and wherein the first quantity and the second quantity are the same.

8. The apparatus of claim 2, wherein the first search space set and the second search space set are associated with a common search space set index.

9. The apparatus of claim 8, wherein the instructions are further executable by the one or more processors, individually or collectively, to cause the apparatus to:
receive, via the scheduling configuration, an indication of a third search space set associated with the first component carrier, the third search space set associated with the common search space set index, wherein monitoring the first search space set and the second search space set is based at least in part on the first search space set, the second search space set, and the third search space set being associated with the common search space set index.

10. The apparatus of claim 1, wherein the instructions to receive the at least one repetition of the control message are executable by the one or more processors, individually or collectively, to cause the apparatus to:
receive a first repetition of the control message in the first downlink control channel candidate; and receive a second repetition of the control message in the second downlink control channel candidate, wherein transmitting or receiving the communication is based at least in part on receiving the first repetition of the control message, the second repetition of the control message, or both.

11. The apparatus of claim 10, wherein the instructions are further executable by the one or more processors, individually or collectively, to cause the apparatus to:
perform soft-combining of a first signal corresponding to the first downlink control channel candidate with a second signal corresponding to the second downlink control channel candidate to decode the control message.

12. The apparatus of claim 1, wherein the instructions are further executable by the one or more processors, individually or collectively, to cause the apparatus to:
identify one of the first downlink control channel candidate or the second downlink control channel candidate as a reference downlink control channel candidate.

13. The apparatus of claim 12, wherein the instructions are further executable by the one or more processors, individually or collectively, to cause the apparatus to:
receive, via the scheduling configuration, an indication of the reference downlink control channel candidate, wherein identifying one of the first downlink control channel candidate or the second downlink control channel candidate as the reference downlink control channel candidate is based at least in part on the scheduling configuration.

14. The apparatus of claim 12, wherein the first downlink control channel candidate is associated with a first search space set and the second downlink control channel candidate is associated with a second search space set, the first downlink control channel candidate is on a second component carrier, the second downlink control channel candidate is on one of the first component carrier or a third component carrier, and the instructions are further executable by the one or more processors, individually or collectively, to cause the apparatus to:
identify one of the first downlink control channel candidate or the second downlink control channel candidate as the reference downlink control channel candidate based at least in part on one or more parameters associated with the first component carrier, the second component carrier, the third component carrier, or any combination thereof, the one or more parameters comprising a component carrier index, a subcarrier spacing, or both.

15. The apparatus of claim 12, wherein the instructions are further executable by the one or more processors, individually or collectively, to cause the apparatus to:
identify one of the first downlink control channel candidate or the second downlink control channel candidate as the reference downlink control channel candidate based at least in part on which of the first downlink control channel candidate or the second downlink control channel candidate ends later in a time domain, which of the first downlink control channel candidate or the second downlink control channel candidate begins earlier in the time domain, based on the second downlink control channel candidate being in the first component carrier, or any combination thereof.

16. The apparatus of claim 12, wherein the instructions are further executable by the one or more processors, individually or collectively, to cause the apparatus to:

transmit a feedback message responsive to the at least one repetition of the control message within a resource which is determined based at least in part on the reference downlink control channel candidate.

17. The apparatus of claim 12, wherein the instructions are further executable by the one or more processors, individually or collectively, to cause the apparatus to:
transmit a feedback message with a payload size that is determined based at least in part on a downlink assignment index, wherein the downlink assignment index is based at least in part on the reference downlink control channel candidate.

18. The apparatus of claim 12, wherein the instructions to transmit or receive the communication are executable by the one or more processors, individually or collectively, to cause the apparatus to:
transmit or receive the communication with the base station within a slot that is offset relative to the reference downlink control channel candidate.

19. The apparatus of claim 12, wherein the instructions to transmit or receive the communication are executable by the one or more processors, individually or collectively, to cause the apparatus to:
transmit or receive the communication with the base station based at least in part on a beam which is determined based at least in part on the reference downlink control channel candidate.

20. The apparatus of claim 12, wherein the instructions to transmit or receive the communication are executable by the one or more processors, individually or collectively, to cause the apparatus to:
transmit or receive the communication based at least in part on a preparation time associated with the communication which is determined based at least in part on the reference downlink control channel candidate, a channel state information computation time associated with the communication which is determined based at least in part on the reference downlink control channel candidate, or both.

21. The apparatus of claim 1, wherein the control message comprises a downlink control information message.

22. The apparatus of claim 1, wherein transmitting or receiving the communication is based at least in part on the at least one repetition of the control message.

23. An apparatus for wireless communication at a base station, comprising:
one or more processors;
one or more memories coupled with the one or more processors; and
instructions stored in the one or more memories and executable by the one or more processors, individually or collectively, to cause the apparatus to:
transmit, to a user equipment (UE), a scheduling configuration for scheduling communications on a first component carrier, the scheduling configuration indicating at least a first downlink control channel candidate that is linked for control channel repetition to a second downlink control channel candidate, at least one of the first downlink control channel candidate or the second downlink control channel candidate is on a component carrier that is different from the first component carrier;
transmit, to the UE and based at least in part on the scheduling configuration, at least one repetition of a control message in the first downlink control channel candidate or the second downlink control channel candidate, the control message scheduling a communication between the base station and the UE over the first component carrier; and
transmit or receive the communication with the UE over the first component carrier.

24. The apparatus of claim 23, wherein the instructions are further executable by the one or more processors, individually or collectively, to cause the apparatus to:
transmit, via the scheduling configuration, an indication of a first search space set associated with the first downlink control channel candidate and a second search space set associated with the second downlink control channel candidate, wherein transmitting the at least one repetition of the control message is based at least in part on the first search space set, the second search space set, or both.

25. The apparatus of claim 24, wherein the instructions are further executable by the one or more processors, individually or collectively, to cause the apparatus to:
transmit, via the scheduling configuration, an indication of a first subcarrier spacing of the first component carrier and a second subcarrier spacing of the component carrier that is different from the first component carrier, wherein transmitting the at least one repetition of the control message is based at least in part on the first subcarrier spacing, the second subcarrier spacing, or both.

26. The apparatus of claim 25, wherein the first subcarrier spacing and the second subcarrier spacing are the same, and the instructions are further executable by the one or more processors, individually or collectively, to cause the apparatus to:
transmit, via the scheduling configuration, an indication of a periodicity associated with both the first search space set and the second search space set, wherein transmitting the at least one repetition of the control message is based at least in part on the periodicity.

27. The apparatus of claim 25, wherein the first subcarrier spacing is different from the second subcarrier spacing, and the instructions are further executable by the one or more processors, individually or collectively, to cause the apparatus to:
transmit, via the scheduling configuration, an indication of a first periodicity associated with the first search space set and a second periodicity associated with the second search space set, wherein the first periodicity is different from the second periodicity, wherein transmitting the at least one repetition of the control message is based at least in part on the first periodicity, the second periodicity, or both.

28. The apparatus of claim 27, wherein a first ratio between the first subcarrier spacing and the second subcarrier spacing is the same as a second ratio between the first periodicity and the second periodicity.

29. A method for wireless communication at a user equipment (UE), comprising:
receiving, from a base station, a scheduling configuration for scheduling communications on a first component carrier, the scheduling configuration indicating at least a first downlink control channel candidate that is linked for control channel repetition to a second downlink control channel candidate, at least one of the first downlink control channel candidate or the second downlink control channel candidate is on a component carrier that is different from the first component carrier;
receiving, from the base station and based at least in part on the scheduling configuration, at least one repetition of a control message in the first downlink control channel candidate or the second downlink control channel candidate, the control message scheduling a communication between the base station and the UE over the first component carrier; and transmitting or receiving the communication with the base station over the first component carrier.

30. A method for wireless communication at a base station, comprising:

transmitting, to a user equipment (UE), a scheduling configuration for scheduling communications on a first component carrier, the scheduling configuration indicating at least a first downlink control channel candidate that is linked for control channel repetition to a second downlink control channel candidate, at least one of the first downlink control channel candidate or the second downlink control channel candidate is on a component carrier that is different from the first component carrier;

transmitting, to the UE and based at least in part on the scheduling configuration, at least one repetition of a control message in the first downlink control channel candidate or the second downlink control channel candidate, the control message scheduling a communication between the base station and the UE over the first component carrier; and transmitting or receiving the communication with the UE over the first component carrier.

\* \* \* \* \*